US012054350B2

(12) United States Patent
Ibuka et al.

(10) Patent No.: US 12,054,350 B2
(45) Date of Patent: Aug. 6, 2024

(54) MEDIUM PROCESSING DEVICE AND IMAGE FORMING APPARATUS

(71) Applicants: Hitoshi Ibuka, Kanagawa (JP); Kei Sasaki, Kanagawa (JP); Kazuki Seto, Kanagawa (JP)

(72) Inventors: Hitoshi Ibuka, Kanagawa (JP); Kei Sasaki, Kanagawa (JP); Kazuki Seto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/176,728

(22) Filed: Mar. 1, 2023

(65) Prior Publication Data

US 2023/0294950 A1 Sep. 21, 2023

(30) Foreign Application Priority Data

Mar. 18, 2022 (JP) ................................ 2022-044350

(51) Int. Cl.
*B65H 37/04* (2006.01)
*B31F 5/02* (2006.01)
*B31F 7/00* (2006.01)
*B65H 9/04* (2006.01)

(52) U.S. Cl.
CPC ............... *B65H 37/04* (2013.01); *B31F 5/02* (2013.01); *B31F 7/00* (2013.01); *B65H 9/04* (2013.01); *B65H 2301/51616* (2013.01); *B65H 2404/741* (2013.01)

(58) Field of Classification Search
CPC ...... B31F 7/00; B31F 5/02; B31F 2201/0754; B31F 2201/0779; B31F 2201/0771; B65H 2404/741; B65H 37/04; B65H 2301/43828; B65H 2301/51616; G03G 15/6544; G03G 2215/00852
USPC ................................ 270/58.07, 58.08, 58.09
See application file for complete search history.

(56) References Cited

U.S. PATENT DOCUMENTS 2,685,911 A * 8/1954 Haller ............... B29C 66/81427 428/184
2022/0194046 A1* 6/2022 Ogino ....................... B31F 5/02
2022/0394145 A1 12/2022 Seto et al.

FOREIGN PATENT DOCUMENTS

JP 2013-119466 6/2013
JP 2018-100187 6/2018
JP 2018-203430 12/2018

OTHER PUBLICATIONS

U.S. Appl. No. 18/153,023, filed Jan. 11, 2023, Junya Suzuki, et al.
U.S. Appl. No. 18/157,142, filed Jan. 20, 2023, Kensuke Fukuchi, et al.

* cited by examiner

*Primary Examiner* — Leslie A Nicholson, III
(74) *Attorney, Agent, or Firm* — IPUSA, PLLC

(57) ABSTRACT

A medium processing device includes a plurality of crimping teeth and circuitry. The plurality of crimping teeth presses and deforms a position on a sheet bundle to bind the sheet bundle. The sheet bundle is a bundle of stacked sheet-shaped media. The plurality of crimping teeth flattens the position pressed and deformed to unbind the sheet bundle. The circuitry causes the plurality of crimping teeth to sandwich the position on the sheet bundle.

10 Claims, 30 Drawing Sheets

MEDIUM PROCESSING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-044350, filed on Mar. 18, 2022, in the Japan Patent Office, the entire disclosure of which is hereby incorporated by reference herein.

BACKGROUND

Technical Field

Embodiments of the present disclosure relate to a medium processing device and an image forming apparatus incorporating the medium processing device.

Related Art

Medium processing devices are known that bind a plurality of sheet-shaped media into a bundle to form a sheet bundle. Stapling with metal staples is known as a binding process that is executed to form the sheet bundle in the medium processing devices. Some medium processing devices are known that perform staple-free binding to bind the media without metal binding needles (i.e., staples) from a viewpoint of resource saving and reduction in environmental load. The staple-free binding corresponds to so-called "crimp binding" in which a plurality of sheet-shaped media is pressed and deformed while being sandwiched between serrate binding teeth, to form a sheet bundle.

When the sheet bundle is to be loosened after the crimp binding, for example, when one sheet is to be removed from the sheet bundle after the crimp binding, the crimped portion of the sheet may not be removed and may be damaged. One approach to prevent such damage is providing an unbinding device that unbinds the sheet bundle separately from a binding device.

In the related art, an apparatus has been upsized to include both the binding device and the unbinding device.

SUMMARY

According to an embodiment of the present disclosure, a novel medium processing device includes a plurality of crimping teeth and circuitry. The plurality of crimping teeth presses and deforms a position on a sheet bundle to bind the sheet bundle. The sheet bundle is a bundle of stacked sheet-shaped media. The plurality of crimping teeth flattens the position pressed and deformed to unbind the sheet bundle. The circuitry causes the plurality of crimping teeth to sandwich the position on the sheet bundle.

According to an embodiment of the present disclosure, an image forming apparatus includes an image forming device and the medium processing device. The image forming device forms an image on a sheet-shaped medium. The medium processing device includes the plurality of crimping teeth that presses and deforms the position on the sheet bundle to bind the sheet bundle. The sheet bundle is a bundle of sheet-shaped media on each of which the image is formed.

According to an embodiment of the present disclosure, a medium processing device includes a plurality of crimping teeth, a plurality of flat plate teeth, a movement assembly, and circuitry. The plurality of crimping teeth presses and deforms a position on a sheet bundle to bind the sheet bundle. The sheet bundle is a bundle of stacked sheet-shaped media. The plurality of flat plate teeth flattens an uneven shape at the position on the sheet bundle bound, to unbind the sheet bundle. The movement assembly moves the plurality of crimping teeth and the plurality of flat plate teeth to the position on the sheet bundle. The circuitry causes the plurality of crimping teeth to sandwich the position on the sheet bundle. The circuitry causes the plurality of flat plate teeth to sandwich the position on the sheet bundle.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
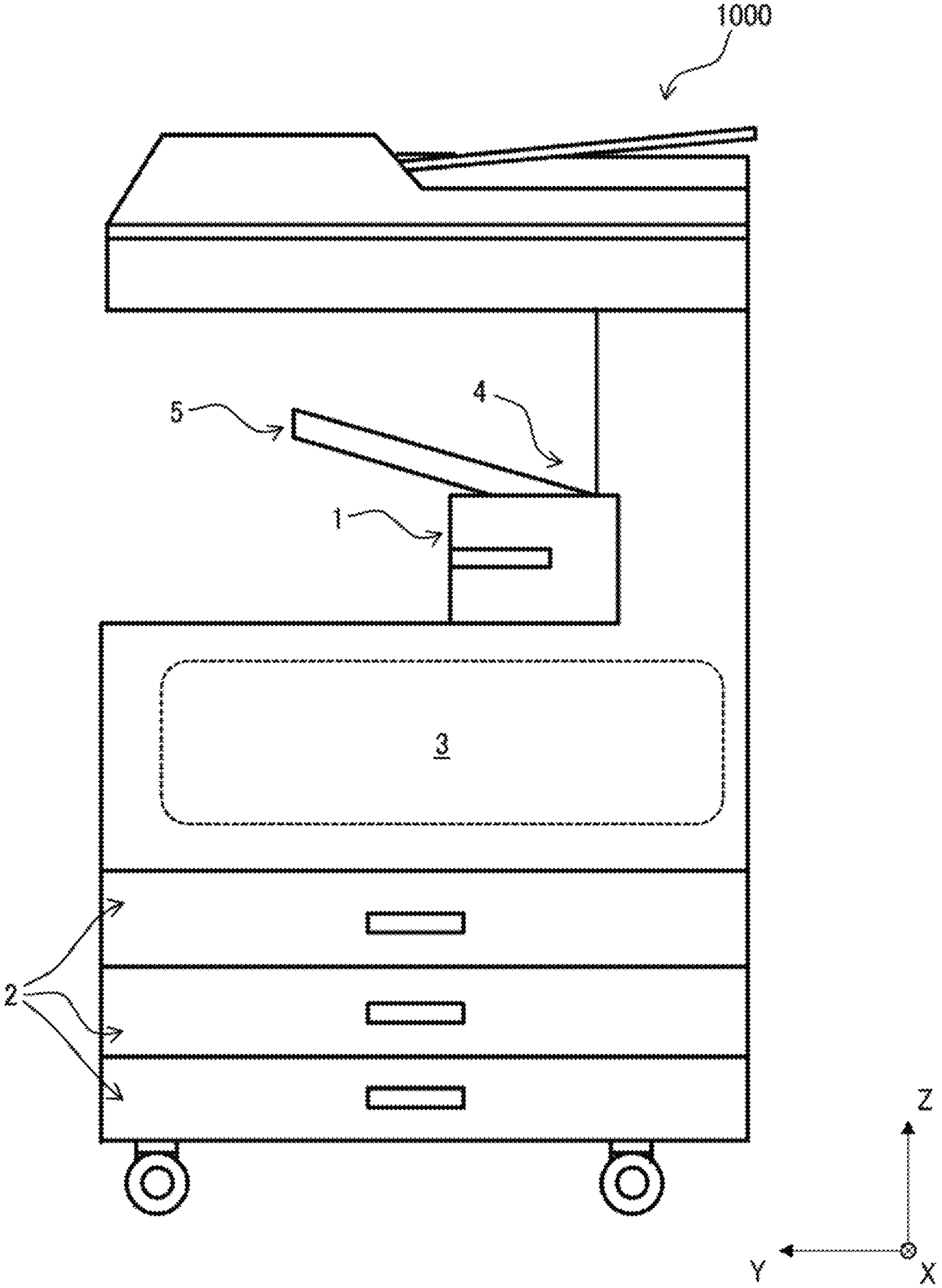
FIG. 1 is a diagram illustrating the overall configuration of a multifunction peripheral (MFP) as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

As used herein, the term "connected/coupled" includes both direct connections and connections in which there are one or more intermediate connecting elements.

Initially, with reference to FIG. 1, a description is given of an image forming apparatus according to an embodiment of the present disclosure.

FIG. 1 is an overall external view of a multifunction peripheral (MFP) 1000 as an image forming apparatus according to the present embodiment.

As illustrated in FIG. 1, the MFP 1000 according to the present embodiment includes a sheet processing unit 1 as a medium processing unit or medium processing device according to the present embodiment.

In addition to the sheet processing unit 1, the MFP 1000 includes a sheet storage unit 2, an image forming unit 3 serving as an image forming device, a sheet ejection unit 4, and an output tray 5. The sheet storage unit 2 includes trays to store sheets P as sheet-shaped media. The image forming unit 3 forms an image on the sheet P. The sheet ejection unit 4 ejects the sheet P. The output tray 5 holds the sheets P ejected and stacked on the output tray 5.

The MFP 1000 picks up the sheets P stored in the sheet storage unit 2 one at a time and conveys the sheet P toward the image forming unit 3 with a roller assembly. The image forming unit 3 forms an image on the sheet P. The sheet P bearing the image is ejected by the sheet ejection unit 4 onto the output tray 5. Thus, the sheets P lie stacked on the output tray 5.

The sheet processing unit 1 is disposed, for example, below the output tray 5. The sheet processing unit 1 serving as a binder binds a bundle of sheets P while a user holds the bundle of sheets P, which has been stacked on the output tray 5, with the hand of the user at a processing position of the sheet processing unit 1. The sheet processing unit 1 corresponds to a so-called "offline crimp binder" as a device that performs crimp binding by offline processing.

Now, a description is given of the medium processing device according to the present embodiment.

Figure 2:
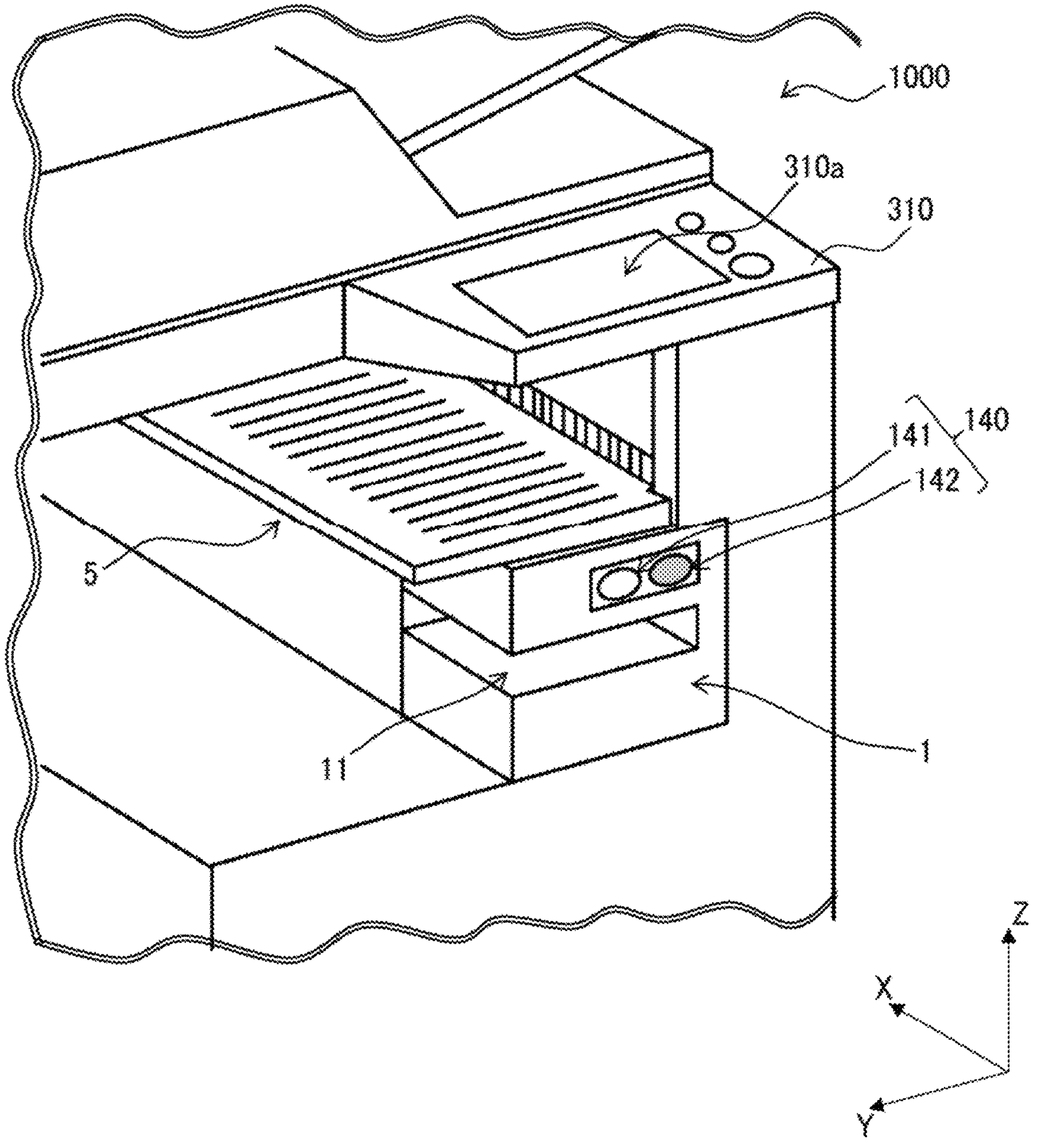
FIG. 2 is a perspective view of a sheet processing unit as a medium processing device according to an embodiment of the present disclosure.

FIG. 2 is an external perspective view of the sheet processing unit 1.

The sheet processing unit 1 includes a sheet insertion 11 into which a user inserts the bundle of sheets P, which has been stacked on the output tray 5, while holding the bundle of sheets P, to crimp and bind the bundle of sheets P. In the sheet insertion 11, "offline crimp binding" and "offline unbinding" are performed. In other words, the bundle of sheets P is crimped and bound off-line. The bundle of sheets P thus crimped and bound is unbound off-line.

The sheet processing unit 1 further includes an instruction button unit 140 with which the user instructs the offline crimp binding and the offline unbinding. The instruction button unit 140 includes a binding instruction button 141 and an unbinding instruction button 142. The binding instruction button 141 is used to give an instruction to apply pressure and crimp an end portion of a bundle of sheets P to bind the bundle of sheets P. The unbinding instruction button 142 is used to give an instruction to act on the bound position on the bundle of sheets P that has been bound and unbind the bundle of sheets P. In the following description, a bundle of sheets P may be referred to as a sheet bundle Pb. The MFP 1000 includes a control panel 310 through which a user gives instructions for processing. The control panel 310 includes a display 310*a* that displays the state of processing executed in the MFP 1000. The processing state of the sheet processing unit 1 is also displayed on the display 310*a* of the control panel 310.

Now, a description is given of an outline of a binding operation that is performed by the sheet processing unit 1.

Figure 3:
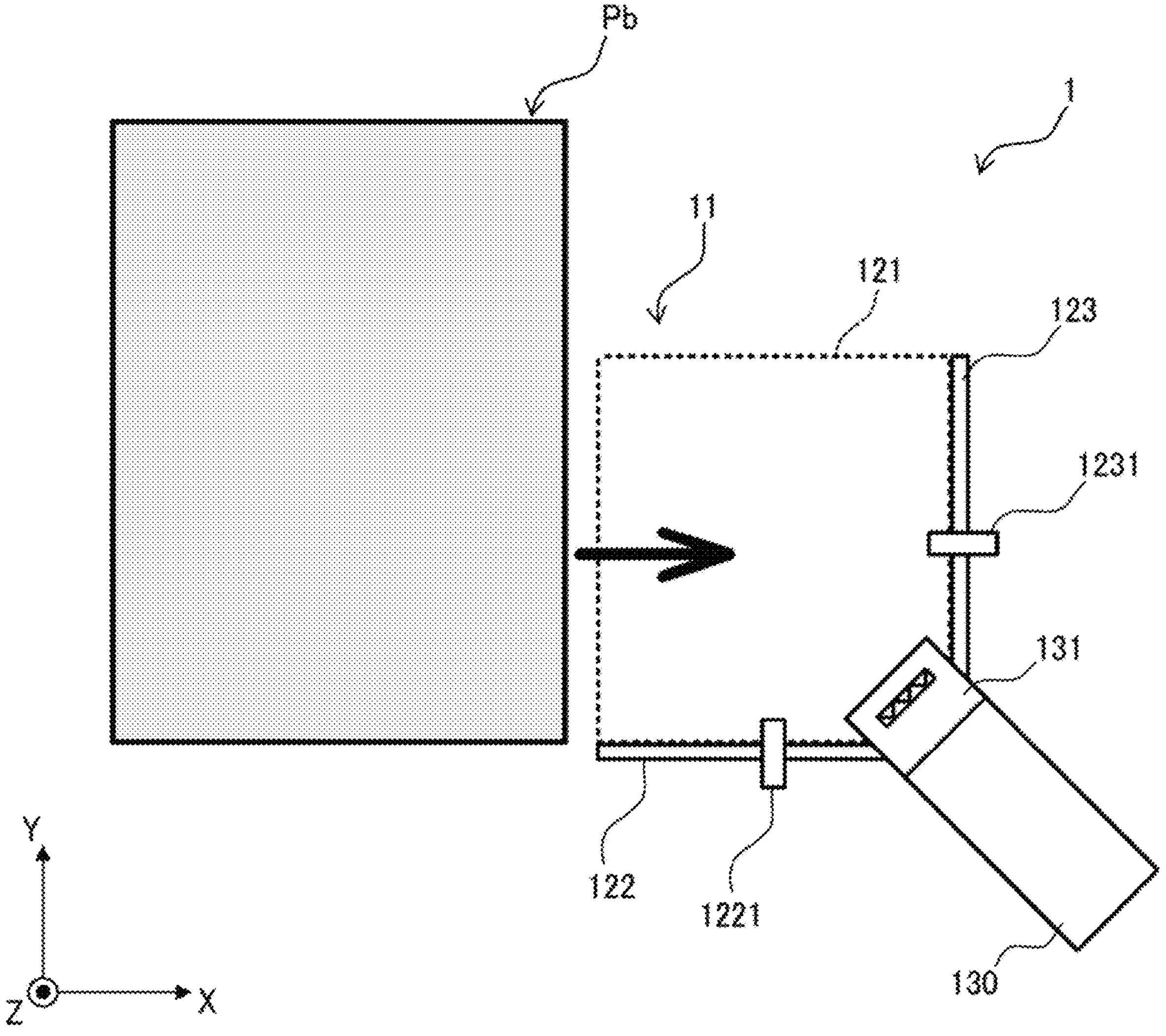
FIG. 3 is a plan view of the sheet processing unit of FIG. 2 in a binding operation with a sheet bundle to be bound.

FIG. 3 is a plan view of the inside of the sheet insertion 11. Specifically, FIG. 3 illustrates the inside of the sheet insertion 11 viewed from above in the vertical direction.

The sheet processing unit 1 includes a plurality of surface members surrounding and defining the sheet insertion 11 as a space into which a sheet bundle Pb is inserted. Specifically, the sheet processing unit 1 includes a bottom 121, a side restraint wall 122, a rear restraint wall 123, and an upper wall 124.

The bottom 121 supports the sheet bundle Pb inserted into a given position in the sheet insertion 11 and having an end portion in contact with a position restraint that determines a binding position, which is a position to be bound, on the sheet bundle Pb. The side restraint wall 122 is disposed at a side end portion of the sheet insertion 11. The side end portion of the sheet insertion 11 corresponds to an outer shape portion of the bottom 121 and restrains the position of the sheet bundle Pb inserted from the opening of the sheet insertion 11. The rear restraint wall 123 is disposed at a rear end portion of the sheet insertion 11. The rear end portion of the sheet insertion 11 corresponds to an end opposite the opening of the sheet insertion 11. The upper wall 124 is an upper side of the sheet insertion 11 as illustrated in, for example, FIGS. 7A and 7B.

Each of the side restraint wall 122 and the rear restraint wall 123 as two sheet-insertion restraint walls is provided with a sensor that detects the sheet bundle Pb inserted into the given position. Specifically, the side restraint wall 122 is provided with a sheet side-end sensor 1221 that detects a side end of the sheet bundle Pb inserted by a user. The rear restraint wall 123 is provided with a sheet rear-end sensor 1231 that detects the rear end of the sheet bundle Pb inserted by the user. The sheet side-end sensor 1221 and the sheet rear-end sensor 1231 detect that the sheet bundle Pb has reached the given position to restrain the position of the sheet bundle Pb. The sheet side-end sensor 1221 and the sheet rear-end sensor 1231 serve as sheet-bundle position restraints that output detection signals based on which whether the sheet bundle Pb is in contact with the side restraint wall 122 and the rear restraint wall 123 is determined. The detection signals output from the sheet side-end sensor 1221 and the sheet rear-end sensor 1231 are acquired by a sheet processing controller 150 as a control unit of the sheet processing unit 1. The sheet processing controller 150 determines whether the sheet bundle Pb to be bound is at a normal processing position. The sheet processing controller 150 operates a binding unit 130 when the sheet bundle Pb is at the normal processing position. A detailed description of the sheet processing controller 150 is deferred.

The binding unit 130 is disposed near an intersection of a side wall and a rear wall of the sheet insertion 11, specifically, near an intersection of the side restraint wall 122 and the rear restraint wall 123. The binding unit 130 includes a crimping unit 131. The crimping unit 131 is inclined with respect to both the side restraint wall 122 and the rear restraint wall 123 near the intersection of the side restraint wall 122 and the rear restraint wall 123. As will be described later, the crimping unit 131 includes a pair of crimping teeth 1311. When the pair of crimping teeth 1311 sandwiches an end portion of the sheet bundle Pb and applies pressure to crimp the end portion of the sheet bundle Pb, the fibers of the sheets P of the sheet bundle Pb are entangled with each other. Thus, the sheets P are bound. An imaginary line indicating a longitudinal direction of the pair of crimping teeth 1311 is inclined with respect to both the side restraint wall 122 and the rear restraint wall 123.

Figure 4:
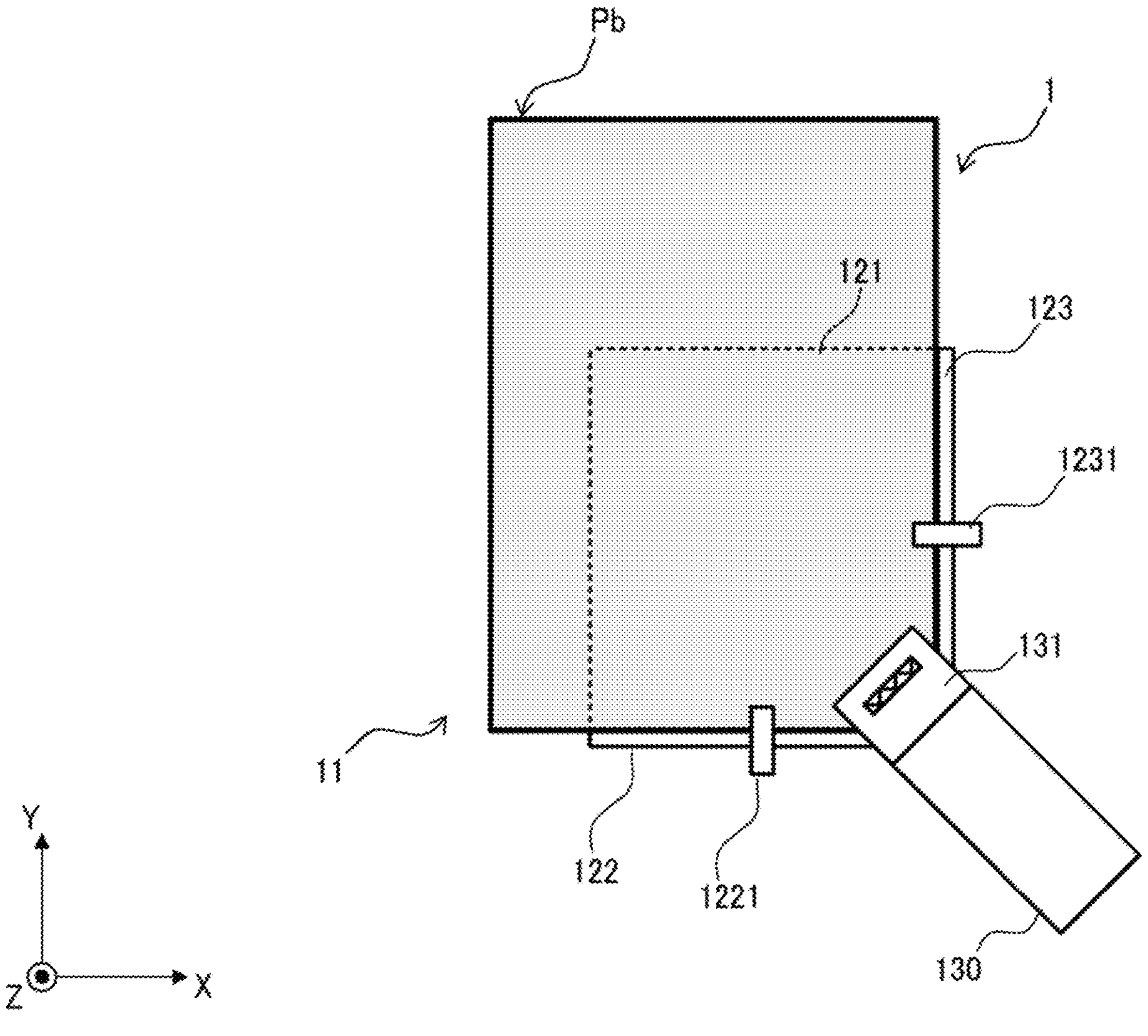
FIG. 4 is a plan view of the sheet processing unit of FIG. 2 with the sheet bundle inserted.

A user inserts the sheet bundle Pb into the opening of the sheet insertion 11 as indicated by the thick arrow in FIG. 3 to crimp and bind the sheet bundle Pb. Subsequently, as illustrated in FIG. 4, the user brings the sheet bundle Pb into contact with the side restraint wall 122 and the rear restraint wall 123 to align the end portion of the sheet bundle Pb and position the sheet bundle Pb. At this time, the sheet side-end sensor 1221 and the sheet rear-end sensor 1231 detect the sheet bundle Pb, allowing the crimping unit 131 to be ready for moving for the crimp binding. When the user operates the binding instruction button 141 while the crimping unit 131 is ready for moving for the crimp binding, the binding process is executed. Alternatively, the user may operate the binding instruction button 141 and then insert the sheet bundle Pb into the sheet insertion 11. In this case, the crimping unit 131 may be controlled to move for the crimp binding at a given time in response to the sheet side-end sensor 1221 and the sheet rear-end sensor 1231 detecting the sheet bundle Pb.

Figure 5:
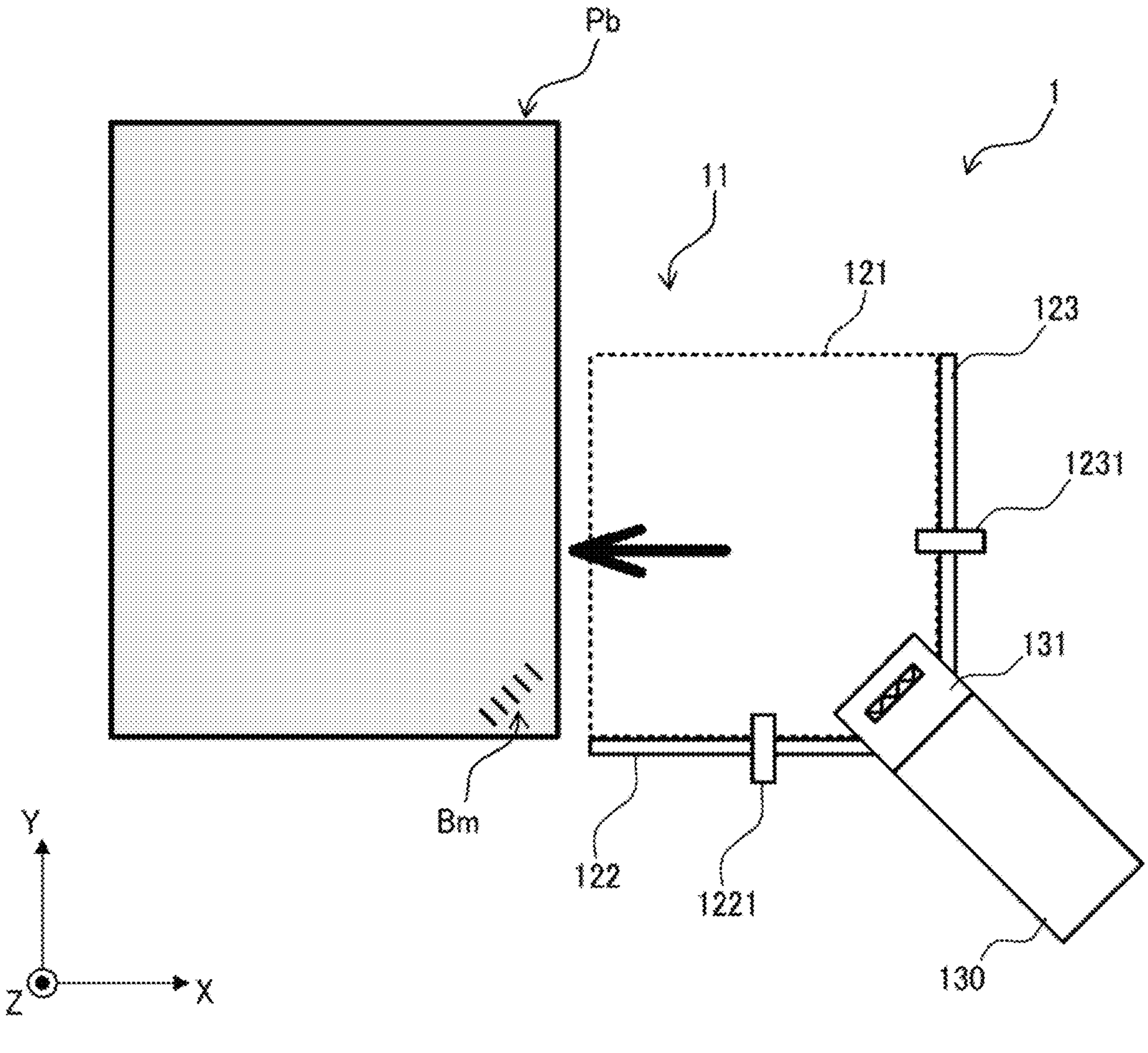
FIG. 5 is a plan view of the sheet processing unit of FIG. 2 with the sheet bundle bound.

Thereafter, the user takes out the sheet bundle Pb from the sheet insertion 11 as illustrated in FIG. 5. Thus, the user obtains the sheet bundle Pb having a given position crimped and bound. In this case, a crimping trace Bm is formed at a position as illustrated in FIG. 5, at one end portion of the sheet bundle Pb.

Figure 6:
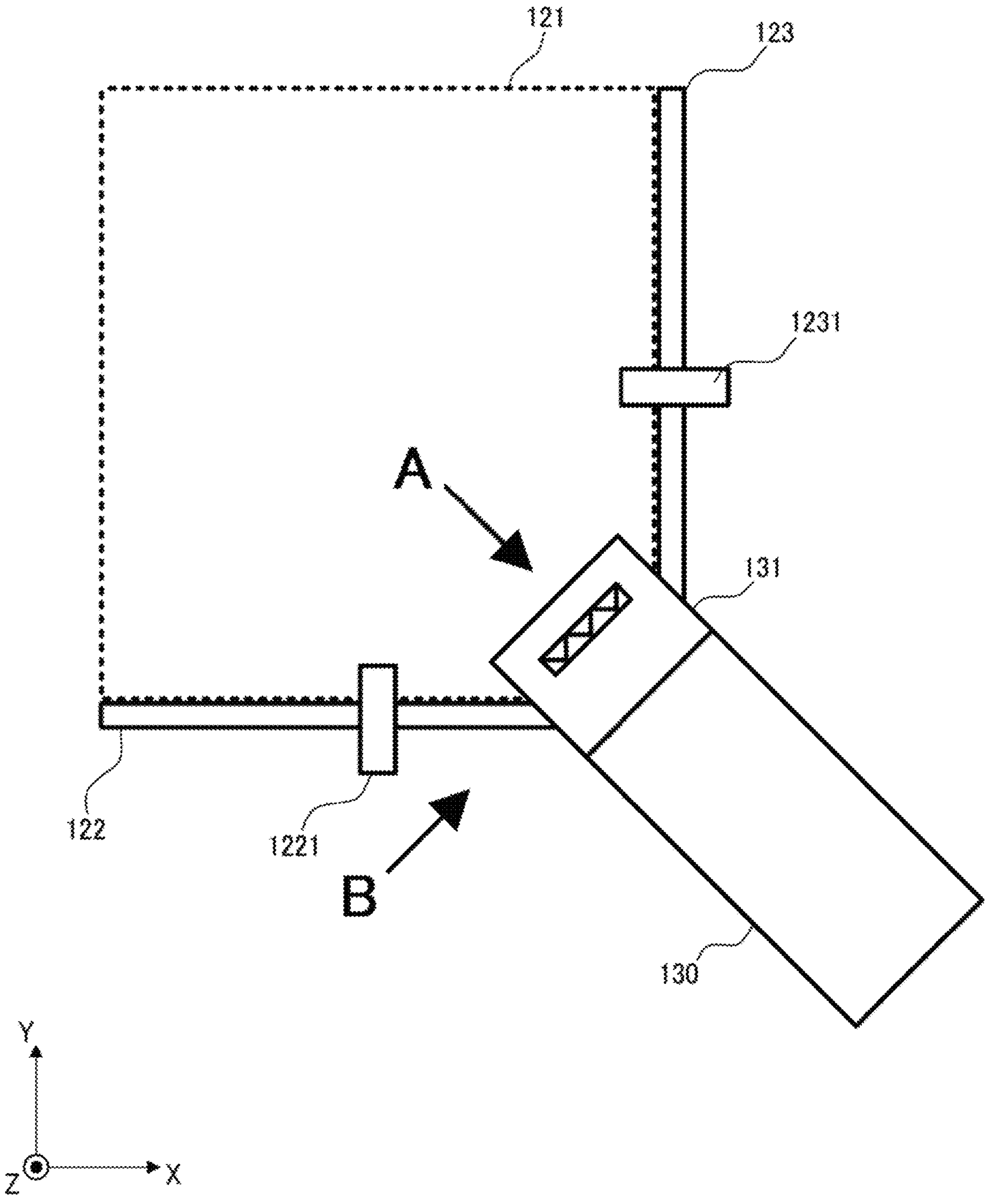
FIG. 6 is an enlarged plan view of the location of a binding unit included in the sheet processing unit of FIG. 2.

FIG. 6 is an enlarged plan view of the location of the binding unit 130.

Figure 7A:
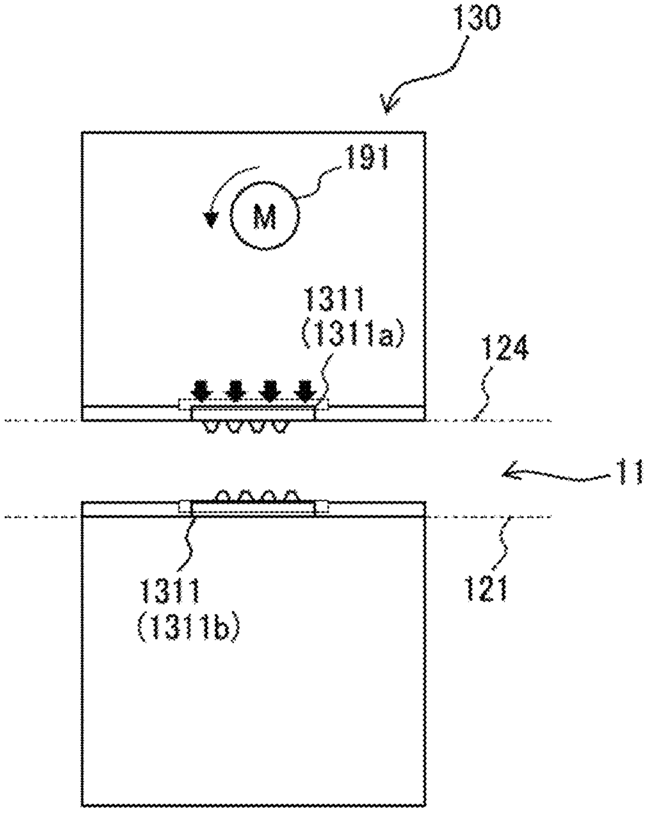
FIG. 7A is a side view of the binding unit of FIG. 6, as viewed in a direction indicated by arrow A of FIG. 6.

FIG. 7A is a side view of the binding unit 130, as viewed in a direction indicated by arrow A of FIG. 6.

Figure 7B:
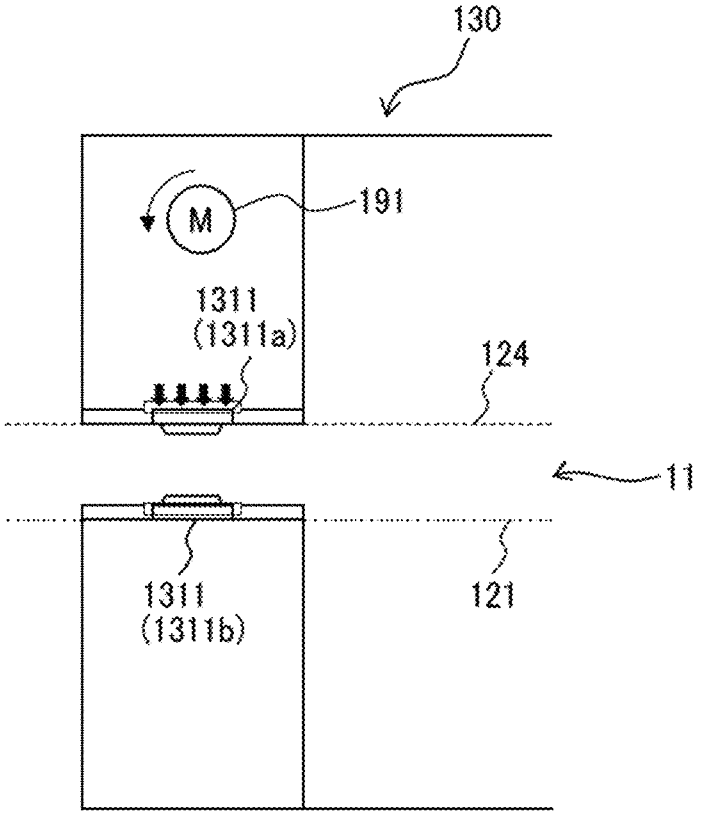
FIG. 7B is a side view of the binding unit of FIG. 6, as viewed in a direction indicated by arrow B of FIG. 6.

FIG. 7B is a side view of the binding unit 130, as viewed in a direction indicated by arrow B of FIG. 6.

In the following description, the direction indicated by arrow A and the direction indicated by arrow B may be referred to as a direction A and a direction B, respectively.

The sheet processing unit 1 includes the crimping unit 131 that includes the pair of crimping teeth 1311 facing each other in the space of the sheet insertion 11 as illustrated in FIGS. 7A and 7B. The crimping unit 131 includes a crimping motor 191 that functions as a driving source for the crimping process. The driving force of the crimping motor 191 drives, via a driving assembly, the pair of crimping teeth 1311 that is constructed of upper crimping teeth 1311*a* and lower crimping teeth 1311*b*. Specifically, the upper crimping teeth 1311*a* are moved down toward the lower crimping teeth 1311*b* to sandwich the sheet bundle Pb inserted between the upper crimping teeth 1311*a* and the lower crimping teeth 1311*b*, with the lower crimping teeth 1311*b*. Thus, the upper crimping teeth 1311*a* and the lower crimping teeth 1311*b* press and deform the sheet bundle Pb to bind the sheet bundle Pb.

Figure 8A:
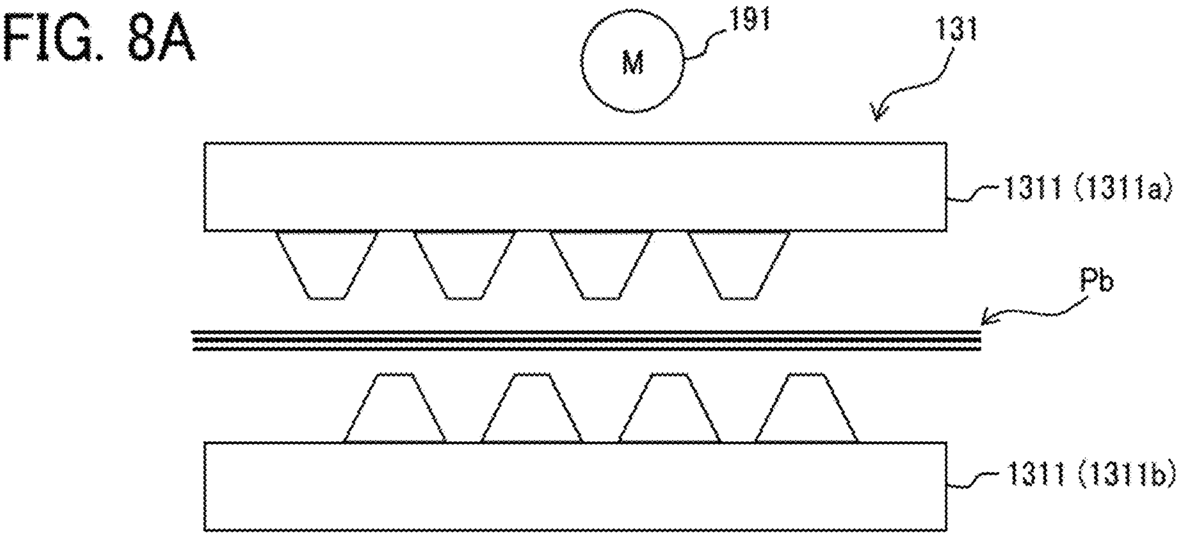
FIGS. 8A to 8C are views of crimping teeth included in the sheet processing unit of FIG. 2.
Figure 8B:
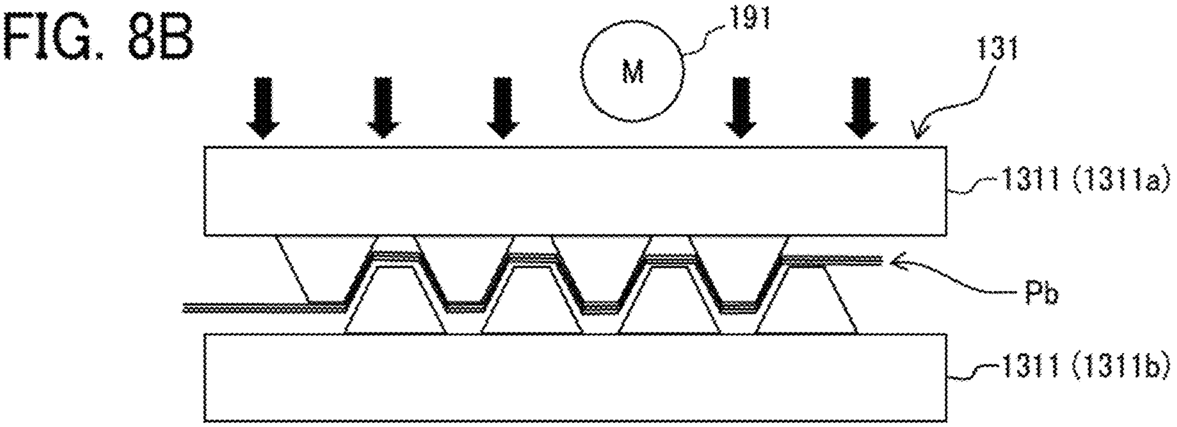
Figure 8C:
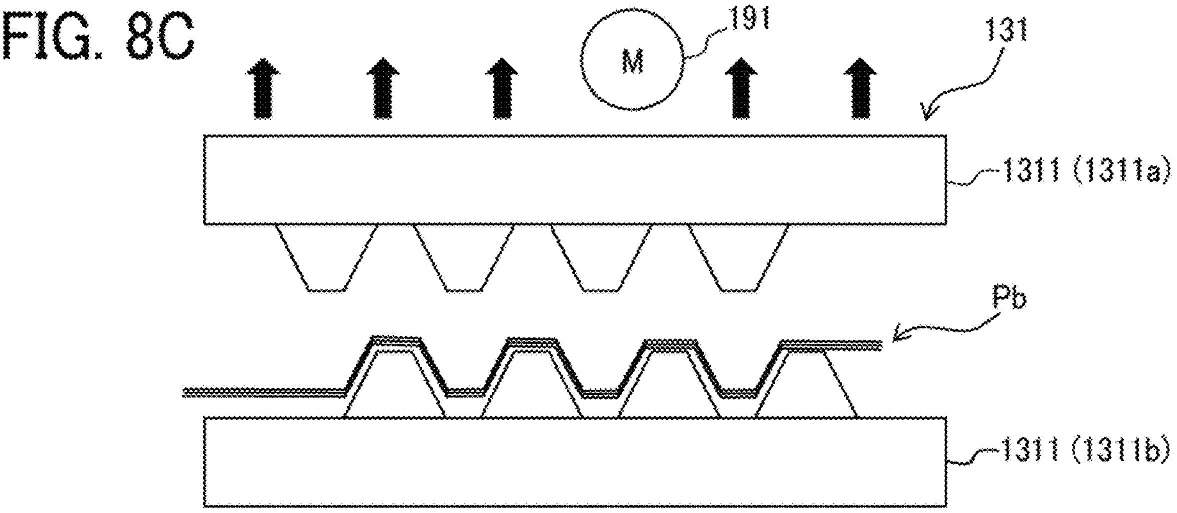

Referring now to FIGS. 8A to 8C, a description is given of a configuration of the pair of crimping teeth 1311 (i.e., the upper crimping teeth 1311*a* and the lower crimping teeth 1311*b*).

As described above, the pair of crimping teeth 1311 is constructed of the upper crimping teeth 1311*a* and the lower crimping teeth 1311*b*, which are serrate teeth. The upper crimping teeth 1311*a* and the lower crimping teeth 1311 as serrate teeth face each other in a thickness direction of the sheet bundle Pb to sandwich the sheet bundle Pb inserted in the sheet insertion 11.

Specifically, the upper crimping teeth 1311*a* are serrate teeth forming alternate concave portions and convex portions, which form a face of upper crimping teeth 1311*a*. Similarly, the lower crimping teeth 1311*b* are serrate teeth forming alternate concave portions and convex portions, which form a face of the lower crimping teeth 1311*b*. The face of the upper crimping teeth 1311*a* and the face of the lower crimping teeth 1311*b* face each other. The upper crimping teeth 1311*a* and the lower crimping teeth 1311*b* are positioned such that the concave portions and the convex portions of the upper crimping teeth 1311*a* are shifted from those of the lower crimping teeth 1311*b*, allowing the upper crimping teeth 1311*a* and the lower crimping teeth 1311*b* to be engaged with each other.

When the sheet bundle Pb is inserted into the sheet insertion 11 and the end portion of the sheet bundle Pb is brought into contact with the side restraint wall 122 and the rear restraint wall 123, the upper crimping teeth 1311*a* and the lower crimping teeth 1311*b* are separated from each other as illustrated in FIG. 8A.

When the end portion of the sheet bundle Pb comes into contact with the side restraint wall 122 and the rear restraint wall 123, the sheet side-end sensor 1221 and the sheet rear-end sensor 1231 detect the sheet bundle Pb. The detection signals are acquired by the sheet processing controller 150 of the sheet processing unit 1. A detailed description of the configuration of the sheet processing controller 150 is deferred.

The sheet processing controller 150 transmits a control signal to an image processing controller 350 to notify the image processing controller 350 that the offline crimp binding is executable. In response to the control signal, the image processing controller 350 displays, on the display 310*a* of the control panel 310 included in the MFP 1000, a message notifying the user that "offline crimp binding is executable."

After confirming the message on the control panel 310, the user presses the binding instruction button 141.

When the binding instruction button 141 is pressed, a signal is transmitted to the image processing controller 350. In response to the signal, the image processing controller 350 transmits a control signal to the sheet processing controller 150 to cause the sheet processing controller 150 to start the crimp binding. Thereafter, when the sheet processing controller 150 drives the crimping motor 191 that moves the upper crimping teeth 1311*a*, the force is transmitted to the upper crimping teeth 1311*a* via the driving assembly and causes the upper crimping teeth 1311*a* to approach the lower crimping teeth 1311*b* as illustrated in FIG. 8B. Then, the upper crimping teeth 1311*a* and the lower crimping teeth 1311*b* sandwich the end portion of the sheet bundle Pb. As a result, the pressure is applied in the thickness direction of the sheet bundle Pb and deforms the sheet bundle Pb in the thickness direction of the sheet bundle Pb.

After the sheet bundle Pb is thus bound, the sheet processing controller 150 operates the crimping motor 191 to move up the upper crimping teeth 1311*a* and separate the upper crimping teeth 1311*a* from the lower crimping teeth 1311*b* as illustrated in FIG. 8C. As a result, the sheet bundle Pb can be taken out from the crimping unit 131. As fibers of the sheets P are entangled with each other by crimp binding, a binding trace is formed on the sheet bundle Pb crimped and bound.

Now, a description is given of a first embodiment of the present disclosure.

Specifically, a description is given of an unbinding operation of the sheet processing unit 1 to unbind the sheet bundle Pb that has been crimped and bound.

The sheet processing unit 1 according to the present embodiment unbinds the sheet bundle Pb with the crimping unit 131 that is used to bind the sheet bundle Pb.

Figure 9:
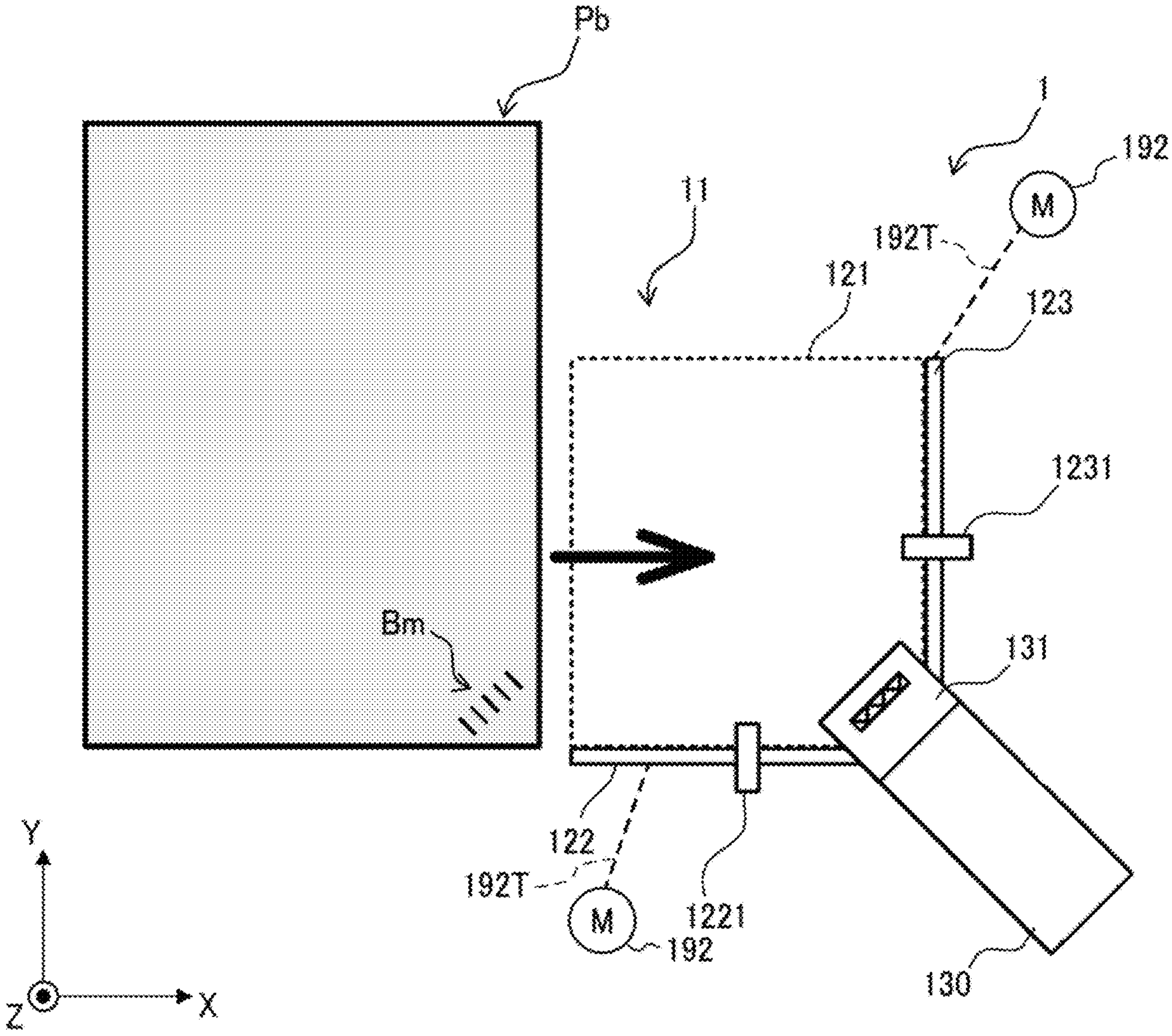
FIG. 9 is a plan view of a sheet processing unit in an unbinding operation according to a first embodiment of the present disclosure, with a bound sheet bundle to be unbound.

First, as illustrated in FIG. 9, the sheet bundle Pb that has been crimped and bound is inserted into the sheet insertion 11 in a direction indicated by the thick arrow in FIG. 9 such that the crimping trace Bm is adjacent to the side restraint wall 122.

Figure 10A:
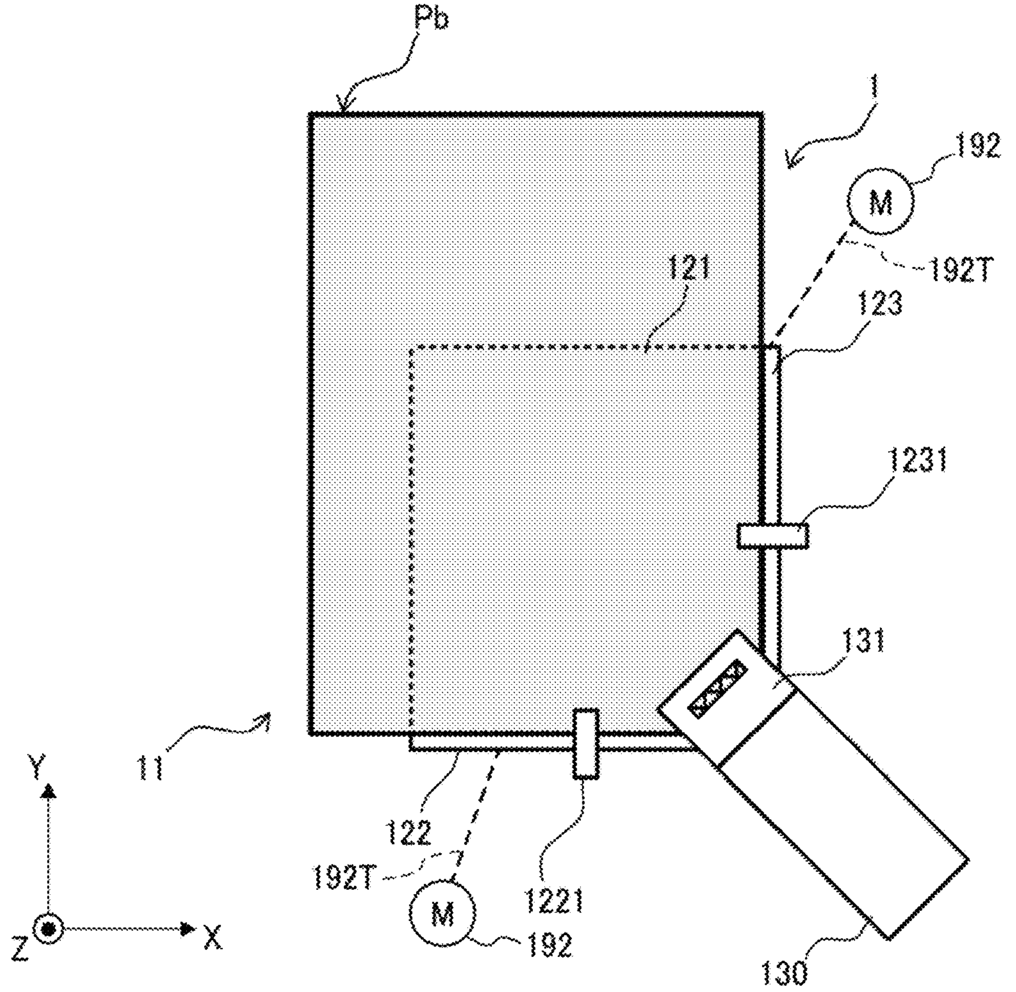
FIGS. 10A and 10B are views of the sheet processing unit of FIG. 9 with the bound sheet bundle inserted.
Figure 10B:
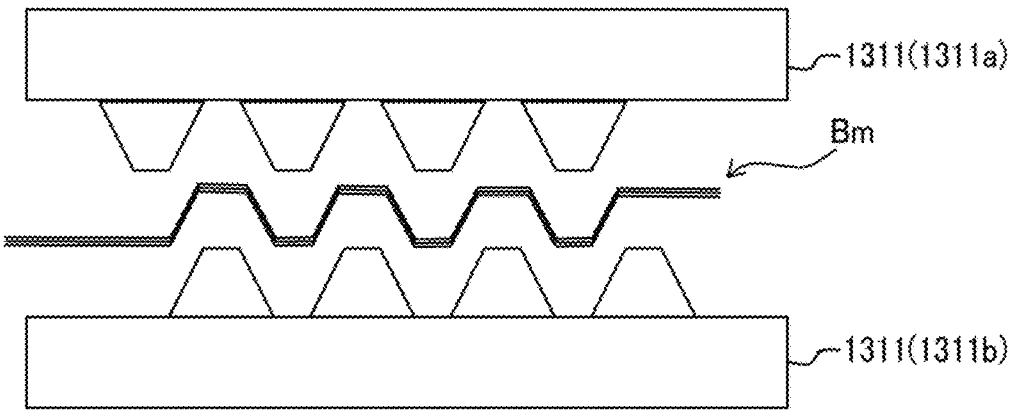

The sheet bundle Pb is inserted into a position where the sheet side-end sensor 1221 and the sheet rear-end sensor 1231 detect the sheet bundle Pb as illustrated in FIG. 10A. FIG. 10B illustrates the relative positions of the crimping trace Bm and the crimping unit 131. FIG. 10B is a view of the pair of crimping teeth 1311, as viewed in the direction A of FIG. 6.

If the upper crimping teeth 1311*a* and the lower crimping teeth 1311*b* are engaged with each other in this state, the bound position on the sheet bundle Pb is further pressed as the unevenness of the crimping trace Bm on the sheet bundle Pb coincides in position with the unevenness of the upper crimping teeth 1311*a* and the lower crimping teeth 1311*b*. In this case, the sheet bundle Pb is not unbound.

Figure 11A:
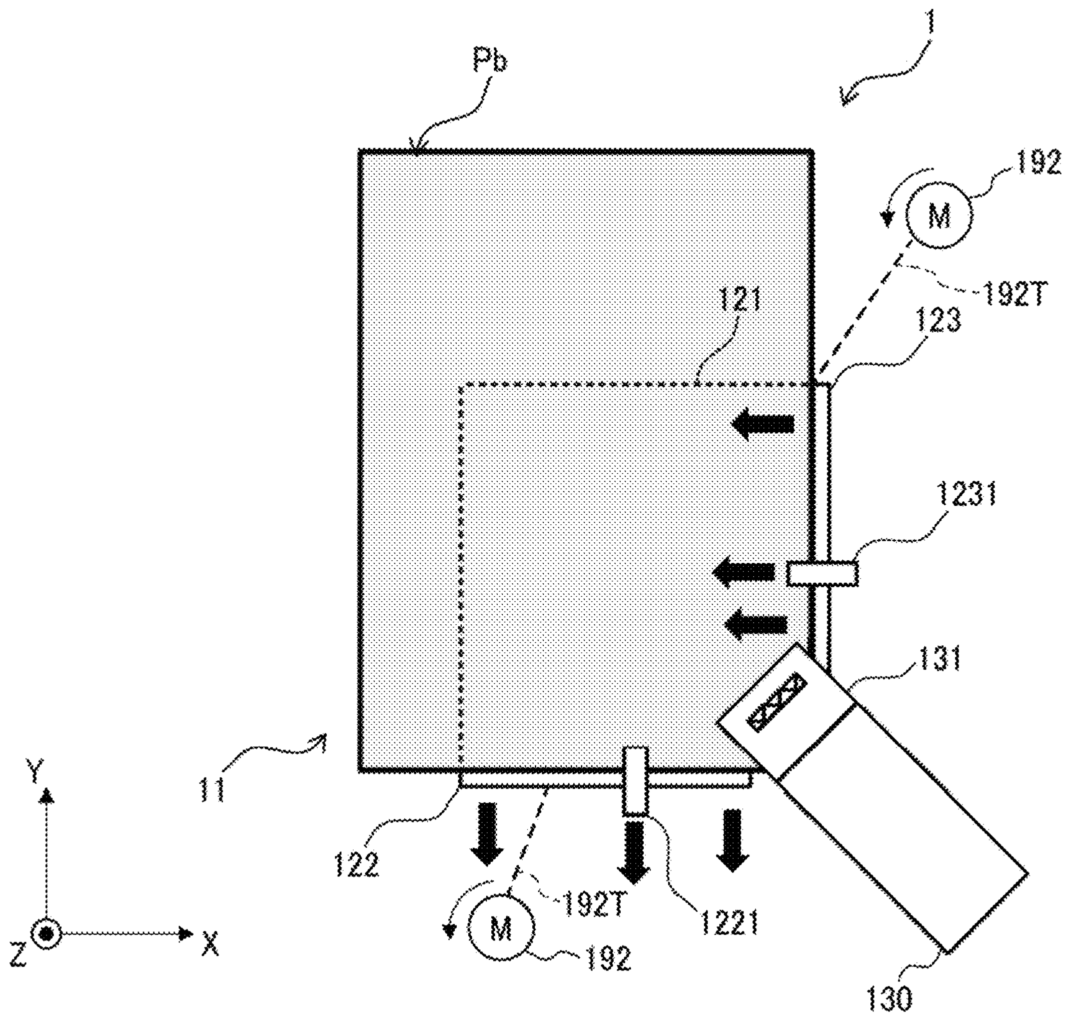
FIGS. 11A and 11B are views of the sheet processing unit of FIG. 9 in which some components are moved to unbind the bound sheet bundle.
Figure 11B:
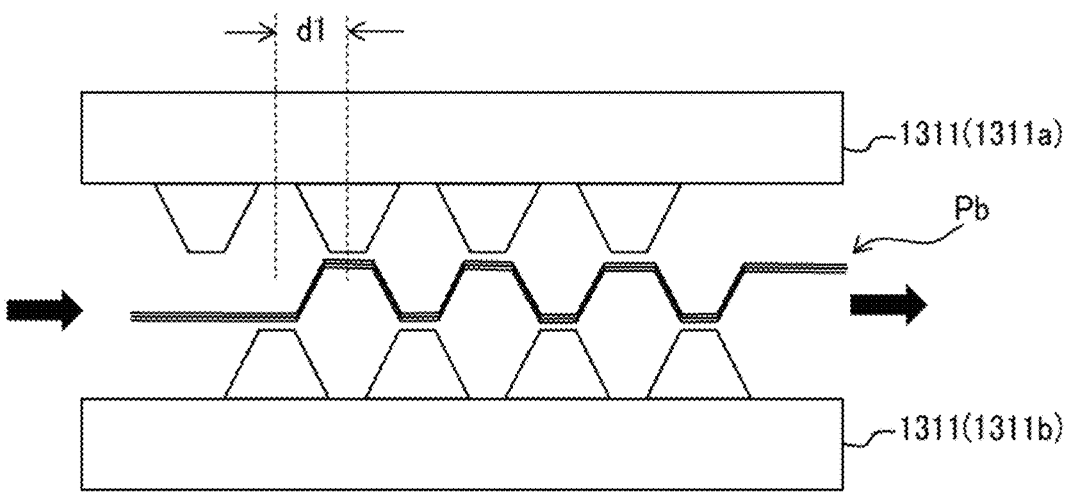

To unbind the sheet bundle Pb, the user presses the unbinding instruction button 142 before inserting the sheet bundle Pb as illustrated in FIG. 10A. In response to the unbinding instruction button 142 being pressed, each of the position of the side restraint wall 122 and the position of the rear restraint wall 123 is moved by a given distance in a given direction as illustrated in FIG. 11A. This movement is referred to as a "given-amount movement." The given-amount movement is caused by the driving forces of wall movement motors 192. The wall movement motor 192 and a drive transmission assembly 192T that transmits the driving force of the wall movement motor 192 function as a position changing assembly that moves the corresponding one of the side restraint wall 122 and the rear restraint wall 123 by the given amount in the given direction to change the relative positions of the crimping unit 131 and the sheet bundle Pb that is inserted.

When each of the side restraint wall 122 and the rear restraint wall 123 is moved by the given amount in the given direction, the positions of the sheet side-end sensor 1221 and the sheet rear-end sensor 1231 are also moved in the same manner. Although FIG. 11A illustrates the given-amount movement of the side restraint wall 122 and the rear restraint wall 123 with the sheet bundle Pb inserted for the sake of description, the given-amount movement of the side restraint wall 122 and the rear restraint wall 123 is executed when the user presses the unbinding instruction button 142, without the sheet bundle Pb inserted.

Now, a description is given of a case where the user inserts the sheet bundle Pb after the execution of the given-amount movement of the side restraint wall 122 and the rear restraint wall 123 in the sheet insertion 11.

Figure 12A:
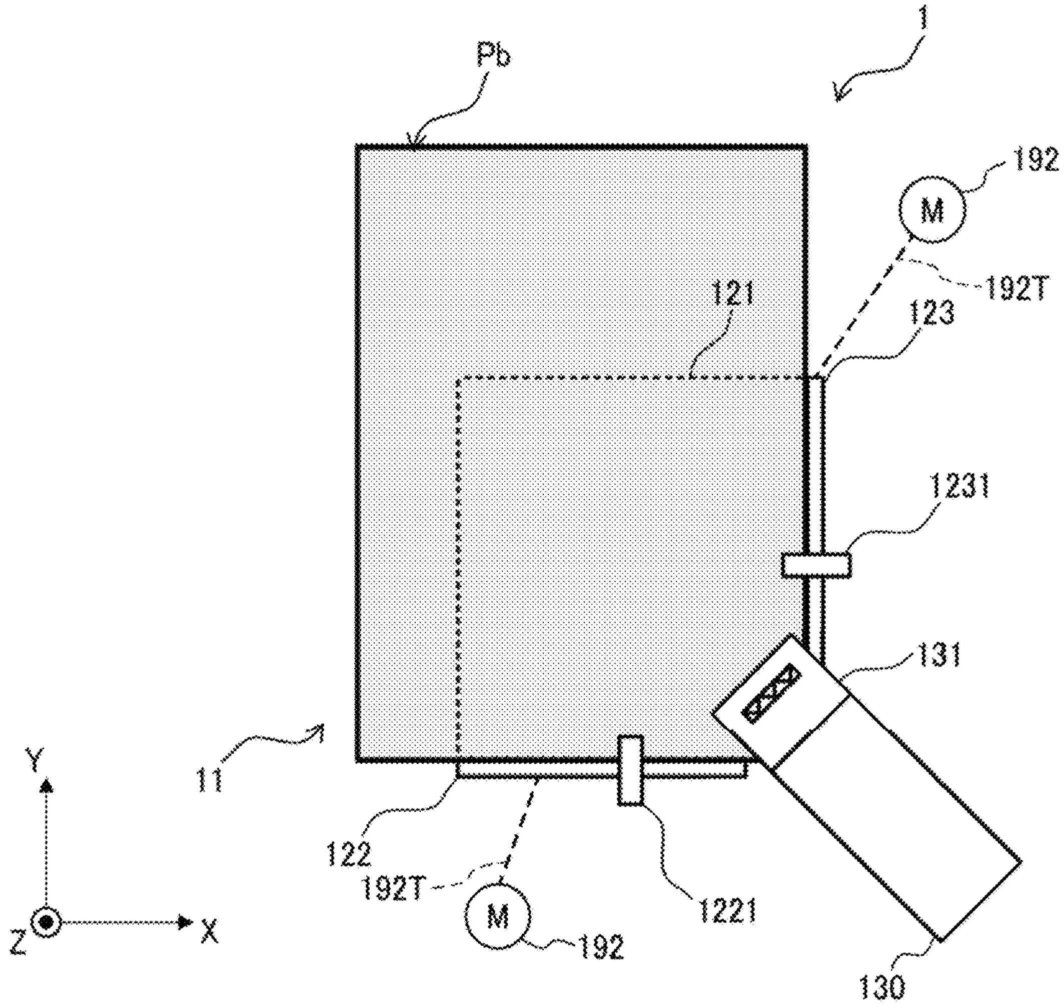
FIGS. 12A and 12B are views of the sheet processing unit of FIG. 9 in the unbinding operation.
Figure 12B:
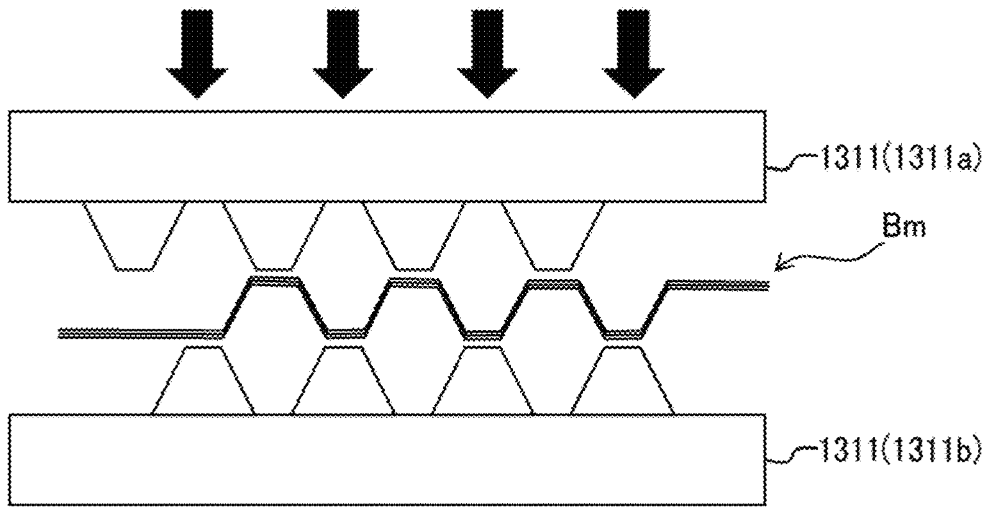

In this case, when the sheet side-end sensor 1221 and the sheet rear-end sensor 1231 detect the sheet bundle Pb, the sheet bundle Pb is located at a position defined by the sheet side-end sensor 1221 and the sheet rear-end sensor 1231 after the given-amount movement from an initial position, which is a position where the binding process is performed. In this case, the crimping trace Bm is located at a position moved by the given-amount movement as illustrated in FIG. 12B. In other words, after the given-amount movement, the convex portions of the upper crimping teeth 1311*a* face the convex portions of the sheet bundle Pb crimped and bound.

In the present embodiment, the position of the crimping trace Bm is moved by a first amount d1 from the position of the convex portions of the upper crimping teeth 1311*a* and the position of the convex portions of the lower crimping teeth 1311*b*, as a result of the given-amount movement.

The movement by the first amount d1 changes the phase between the crimping trace Bm on the sheet bundle Pb and the convex and concave portions of the pair of crimping teeth 1311.

In response to the detection signals indicating that the sheet side-end sensor 1221 and the sheet rear-end sensor 1231 have detected the sheet bundle Pb, the sheet processing controller 150 operates the crimping motor 191 that moves the upper crimping teeth 1311*a* (see FIGS. 7A and 7B). As a result, as illustrated in FIG. 12B, the convex portions of the upper crimping teeth 1311*a* and the convex portions of the lower crimping teeth 1311*b* press the convex portions of the crimping trace Bm on the sheet bundle Pb in the thickness direction of the sheet bundle Pb and flatten the convex portions of the sheet bundle Pb.

Figure 13A:
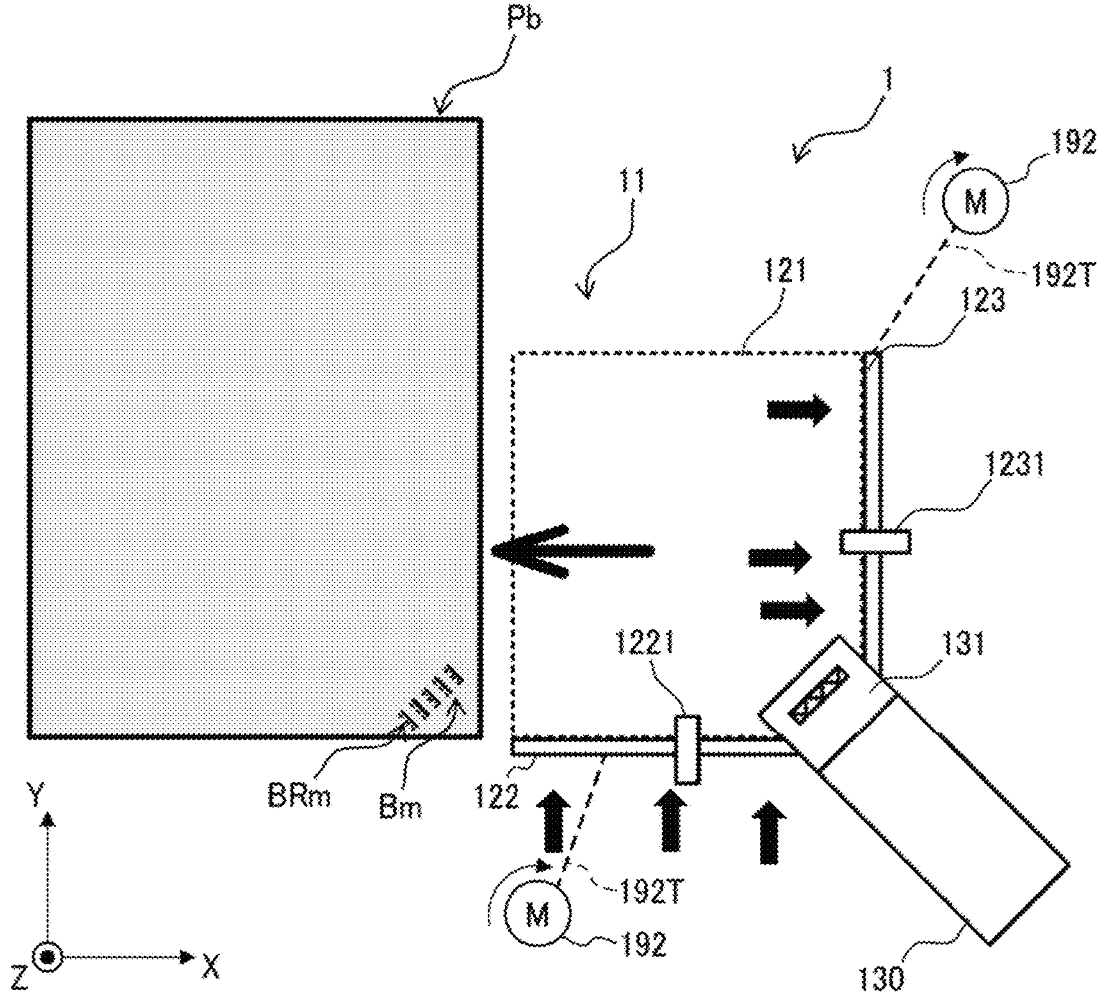
FIGS. 13A and 13B are views of the sheet processing unit of FIG. 9 after the sheet bundle is unbound.
Figure 13B:
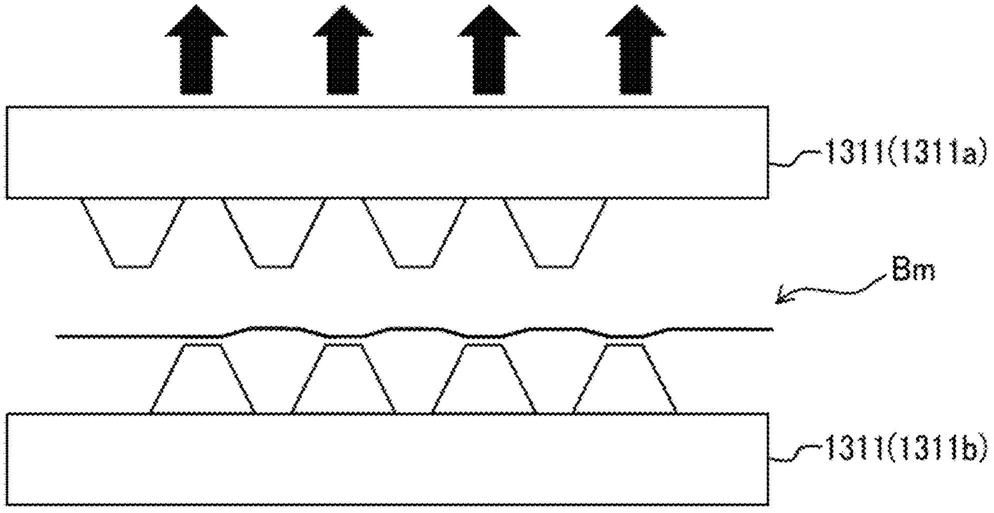

After the crimping trace Bm is pressed, the sheet processing controller 150 operates the crimping motor 191 to move up the upper crimping teeth 1311*a* and separate the upper crimping teeth 1311*a* from the lower crimping teeth 1311*b* as illustrated in FIG. 13B.

As described above with reference to FIGS. 9 to 13B, the sheet processing unit 1 according to the present embodiment performs the unbinding. For example, the unbinding is executed in the following procedure.

First, a user presses the unbinding instruction button 142. As a result, the image processing controller 350 receives a signal from the unbinding instruction button 142. In response to the signal, the image processing controller 350 transmits a control signal to the sheet processing controller 150 to cause the sheet processing controller 150 to start the given-amount movement of the side restraint wall 122 and the rear restraint wall 123.

The sheet processing controller 150 operates the wall movement motors 192 each of which moves the corresponding one of the side restraint wall 122 and the rear restraint wall 123 by the given amount in the given direction as illustrated in FIG. 11A. The driving force is transmitted from the wall movement motor 192 to the corresponding one of the side restraint wall 122 and the rear restraint wall 123 via the drive transmission assembly 192T serving as a movement assembly, resulting in the given-amount movement of the side restraint wall 122 and the rear restraint wall 123. The given-amount movement of the side restraint wall 122 and the rear restraint wall 123 causes the given-amount movement of the sheet side-end sensor 1221 and the sheet rear-end sensor 1231.

After the given-amount movement is completed, the sheet processing controller 150 transmits to the image processing controller 350 a signal indicating the completion of the given-amount movement. The image processing controller 350 displays, on the display 310*a* of the control panel 310, a message prompting the user to insert the sheet bundle Pb to the end of the sheet insertion 11.

After the message is displayed, the user holds and inserts the sheet bundle Pb to bring the sheet bundle Pb into contact with the side restraint wall 122 and the rear restraint wall 123. Thus, the sheet bundle Pb is inserted in a gap between the upper crimping teeth 1311*a* and the lower crimping teeth 1311*b*.

Then, the sheet side-end sensor 1221 and the sheet rear-end sensor 1231 output detection signals indicating the detection of the sheet bundle Pb. In response to the detection signals, the sheet processing controller 150 transmits to the image processing controller 350 a signal indicating that the offline unbinding is executable.

The image processing controller 350 displays, on the display 310*a* of the control panel 310, a message indicating that the offline crimp binding is executable. When the user presses the unbinding instruction button 142 after the message is displayed, a signal is transmitted to the image processing controller 350. In response to the signal, the image processing controller 350 transmits a signal to the sheet processing controller 150 to cause the sheet processing controller 150 to start the unbinding.

In response to the signal, the sheet processing controller 150 operates the crimping motor 191 to move down the upper crimping teeth 1311*a* by a given amount to unbind the sheet bundle Pb as illustrated in FIG. 12B. After the upper crimping teeth 1311*a* is moved down by the given amount and the sheet bundle Pb is unbound, the sheet processing controller 150 rotates the crimping motor 191 in the reverse direction to move up the upper crimping teeth 1311*a* to the position illustrated in FIG. 13B.

Thereafter, when the user pulls out the sheet bundle Pb, the sheet side-end sensor 1221 and the sheet rear-end sensor 1231 no longer detect the sheet bundle Pb. Thereafter, the sheet processing controller 150 operates the wall movement motor 192 to return the side restraint wall 122 and the rear restraint wall 123 to respective binding positions, which are positions before the given-amount movement.

Figure 14:
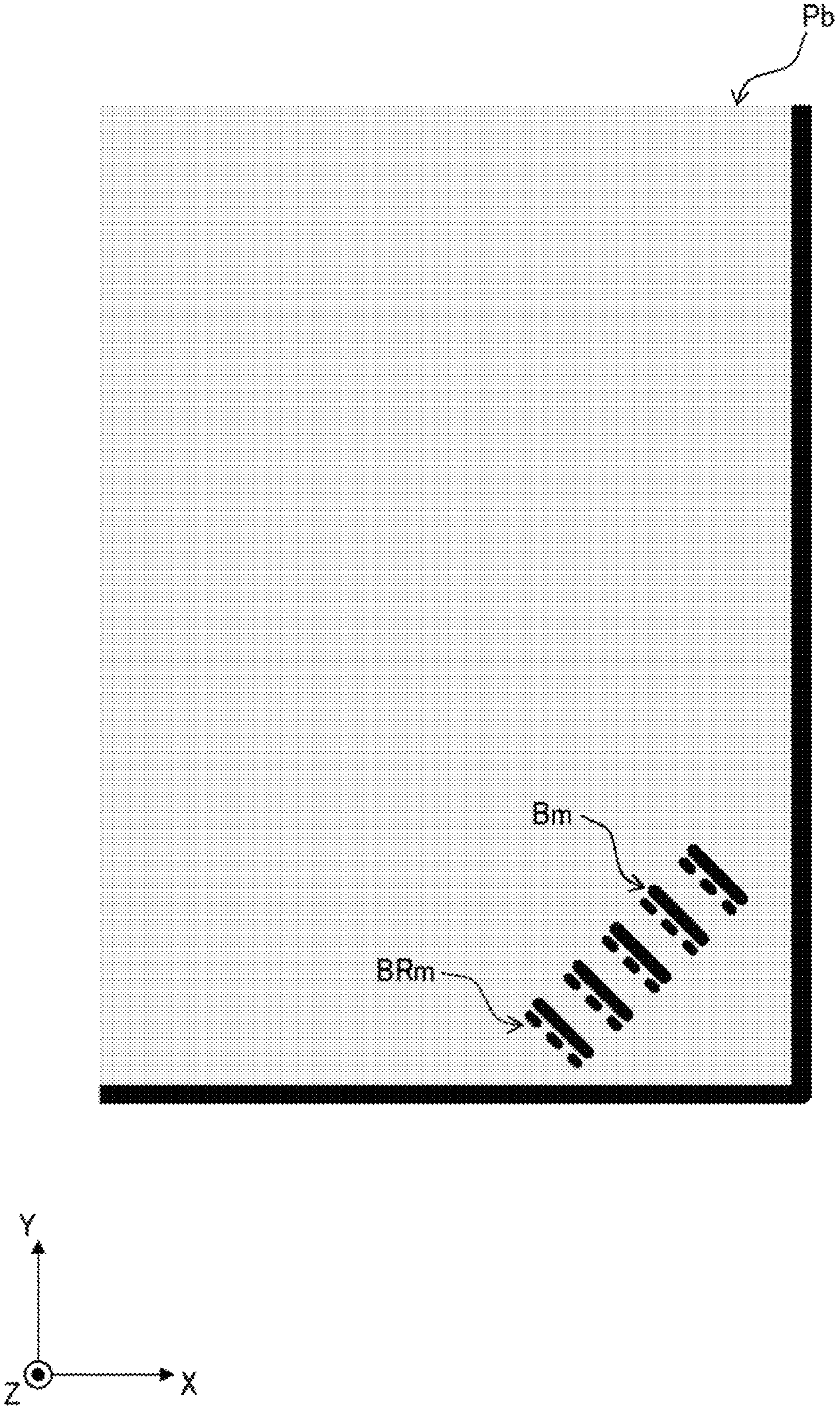
FIG. 14 is an enlarged view of the sheet bundle after the unbinding operation.

FIG. 14 illustrates the sheet bundle Pb unbound according to the present embodiment.

As illustrated in FIG. 14, an unbinding trace BRm remains at almost the same position as the crimping trace Bm. The uneven shape of the bound portion is flattened to form the unbinding trace BRm. As a result, the sheet bundle Pb is smoothed and the binding force between the sheets P is weakened, thus facilitating the removal of the sheets P from the sheet bundle Pb.

As described above, the sheet processing unit 1 of the present embodiment unbinds the sheet bundle Pb with the binding unit 130. In this case, when the user presses the unbinding instruction button 142, the binding position changes to an unbinding position in the sheet processing unit 1. Specifically, the relative positions of the crimping unit 131 of the binding unit 130 and the sheet bundle Pb at the binding position changes to the relative positions of the crimping unit 131 of the binding unit 130 and sheet bundle Pb at the unbinding position.

After the sheet processing unit 1 notifies, through the display 310*a*, the user that the sheet processing unit 1 is in the unbinding position, the user inserts the bound sheet bundle Pb. The pair of crimping teeth 1311 presses the sheet bundle Pb to smooth the crimping trace Bm, thus facilitating the removal of the sheets P from the sheet bundle Pb.

Since the sheet bundle Pb is brought into contact with the side restraint wall 122 and the rear restraint wall 123 after the positions of the side restraint wall 122 and the rear restraint wall 123 that determine the position of the sheet bundle Pb are moved to the respective unbinding positions, the crimping trace Bm and the pair of crimping teeth 1311 are reliably aligned. In addition, the sheet processing unit 1 of the present embodiment reduces the risk of bending the sheet bundle Pb when the sheet bundle Pb comes into contact with the side restraint wall 122 and the rear restraint wall 123, thus facilitating the unbinding of the sheet bundle Pb at the position moved by the first amount d1.

Now, a description is given of the sheet processing unit 1 according to a second embodiment of the present disclosure.

FIGS. 15A to 15E are views of the pair of crimping teeth 1311, as viewed in the direction A of FIG. 6.

In the present embodiment, unlike the first embodiment, the pair of crimping teeth 1311 is moved to change the relative positions of the crimping trace Bm and the pair of crimping teeth 1311.

Figure 15A:
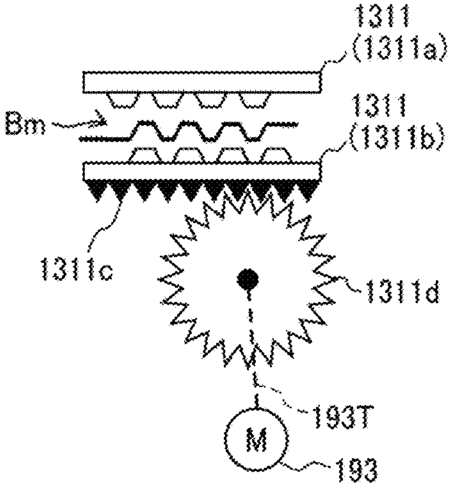
FIGS. 15A to 15E are views of a movement assembly that moves crimping teeth in a sheet processing unit according to a second embodiment of the present disclosure.

As illustrated in FIG. 15A, the sheet processing unit 1 of the present embodiment includes a crimping-teeth-phase changing assembly that is constructed of a pinion gear 1311*d* and a rack gear 1311*c* disposed on the lower crimping teeth 1311*b*. The pinion gear 1311*d* is coupled to a drive transmission assembly 193T and rotated by a driving force transmitted from a teeth movement motor 193 serving as a crimping-teeth-phase changer via the drive transmission assembly 193T.

When the sheet side-end sensor 1221 and the sheet rear-end sensor 1231 detect the sheet bundle Pb, the sheet processing controller 150 transmits to the image processing controller 350 a signal indicating that the offline crimp binding and unbinding are executable. In response to the signal, the image processing controller 350 displays, on the display 310*a* of the control panel 310, a message indicating that the offline crimp binding and unbinding are executable.

After confirming the message, the user presses the unbinding instruction button 142. When the unbinding instruction button 142 is pressed, a signal is transmitted to the image processing controller 350. In response to the signal, the image processing controller 350 transmits a signal to the sheet processing controller 150 to cause the sheet processing controller 150 to start moving the lower crimping teeth 1311*b*.

Figure 15B:
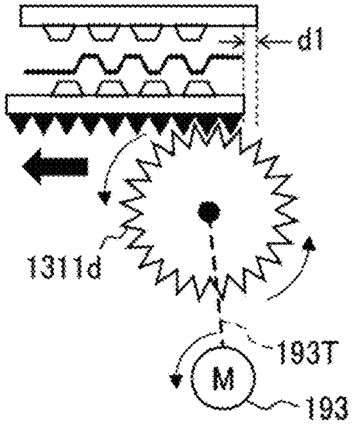

Thereafter, the sheet processing controller 150 operates the teeth movement motor 193. The driving force is transmitted from the teeth movement motor 193 to the pinion gear 1311*d* to rotate the pinion gear 1311*d* by a given amount as illustrated in FIG. 15B. As a result, the phase between the uneven shape of the lower crimping teeth 1311*b* and the uneven shape of the sheet bundle Pb is changed. The amount of movement of the lower crimping teeth 1311*b* corresponds to the first amount d1 as a given amount of movement. The teeth movement motor 193, the pinion gear 1311*d*, and the drive transmission assembly 193T that transmits the driving force to the pinion gear 1311*d* function as a position changing assembly that changes the relative positions of the sheet bundle Pb and the crimping unit 131.

After the pinion gear 1311*d* is rotated as illustrated in FIG. 15B, the sheet processing controller 150 transmits to the image processing controller 350 a signal indicating the completion of movement of the lower crimping teeth 1311*b*.

At the position moved by the first amount d1, the convex portions of the lower crimping teeth 1311*b* face the convex portions on the back side of the sheet bundle Pb crimped and bound. On the other hand, the concave portions of the upper crimping teeth 1311*a* face the convex portions on the front side of the sheet bundle Pb crimped and bound.

Figure 15C:
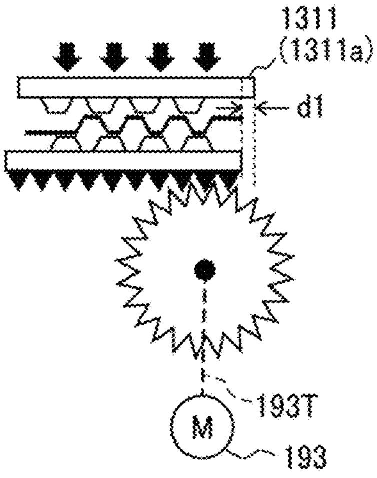

After receiving the signal indicating the completion of movement of the lower crimping teeth 1311*b*, the image processing controller 350 transmits a signal to the sheet processing controller 150 to cause the sheet processing controller 150 to start unbinding the sheet bundle Pb. As a result, as illustrated in FIG. 15C, the sheet processing controller 150 operates the crimping motor 191 that moves the upper crimping teeth 1311*a* (see FIGS. 7A and 7B) to move down the upper crimping teeth 1311*a* and unbind the sheet bundle Pb.

Figure 15D:
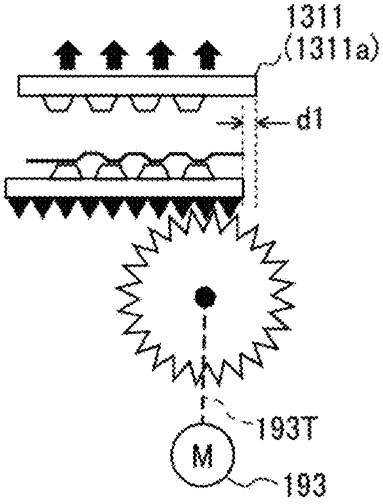

FIG. 15D is a diagram illustrating the sheet processing unit 1 after the sheet bundle Pb is unbound. After unbinding the sheet bundle Pb, the upper crimping teeth 1311*a* are moved up and return to the position before the unbinding operation is performed.

Figure 15E:
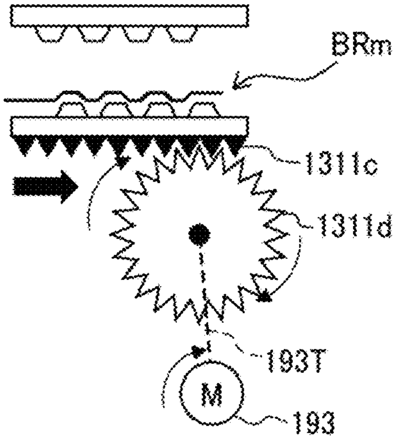

FIG. 15E is a diagram illustrating the pair of crimping teeth 1311 returned to the position before the phase change. The sheet processing controller 150 operates the teeth movement motor 193. The driving force is transmitted from the teeth movement motor 193 to the pinion gear 1311*d* to rotate the pinion gear 1311*d* by the same amount as the given amount described above, in a direction opposite to the direction illustrated in FIG. 15B. As a result, as illustrated in FIG. 15E, the position of the lower crimping teeth 1311*b* returns to the original position.

In the above description, the phase of the pair of crimping teeth 1311 is changed by the movement of the lower crimping teeth 1311*b*. Alternatively, the phase of the pair of crimping teeth 1311 may be changed by the movement of the upper crimping teeth 1311*a* in the same manner as described above.

In FIGS. 15B to 15D, the convex portions of the lower crimping teeth 1311*b* changed in phase face the convex portions of the upper crimping teeth 1311*a* unchanged in phase. In this state, if the upper crimping teeth 1311*a* approaches the lower crimping teeth 1311*b* in the same manner as in the binding operation, the upper crimping teeth 1311*a* and the lower crimping teeth 1311*b* collide with each other and damage each other. To prevent such a situation, in the present embodiment, the pressure of the upper crimping teeth 1311*a* against the lower crimping teeth 1311*b* is adjusted not to damage the upper crimping teeth 1311*a* and the lower crimping teeth 1311*b* by the collision.

Now, a description is given of the sheet processing unit 1 according to a third embodiment of the present disclosure.

FIGS. 16A to 16E are views of the pair of crimping teeth 1311, as viewed in the direction A of FIG. 6.

In the present embodiment, unlike the second embodiment, each of the upper crimping teeth 1311*a* and the lower crimping teeth 1311*b*, which construct the pair of crimping teeth 1311, is moved by a given amount in a given direction. After the pair of crimping teeth 1311 is moved so that the convex portions of the pair of crimping teeth 1311 face the convex portions of the crimping trace Bm, the pair of crimping teeth 1311 flattens the convex portions of the crimping trace Bm and levels the crimping trace Bm, thus facilitating the unbinding of the sheet bundle Pb.

As illustrated in FIGS. 16A to 16E, the rack gear 1311*c* meshing with the pinion gear 1311*d* is disposed on each of the upper crimping teeth 1311*a* and lower crimping teeth 1311*b*. In other words, the crimping-teeth-phase changing assembly that is constructed of the rack gear 1311*c* and the pinion gear 1311*d* is disposed on each of the upper crimping teeth 1311*a* and the lower crimping teeth 1311*b*. Like the pinion gear 1311*d* meshing with the rack gear 1311*c* on the lower crimping teeth 1311*b*, the pinion gear 1311*d* meshing with the rack gear 1311*c* on the upper crimping teeth 1311*a* is coupled to the drive transmission assembly 193T and rotated by the driving force transmitted from the teeth movement motor 193 serving as a crimping-teeth-phase changer via the drive transmission assembly 193T. The teeth movement motor 193, the pinion gear 1311*d*, and the drive transmission assembly 193T that transmits the driving force to the pinion gear 1311*d* function as a position changing assembly that changes the relative positions of the sheet bundle Pb and the crimping unit 131.

As illustrated in FIGS. 16A to 16E, by the given-amount movement of each of the lower crimping teeth 1311*b* and the upper crimping teeth 1311*a*, the upper crimping teeth 1311*a* and the lower crimping teeth 1311*b* change in phase corresponding to the first amount d1. Such a configuration does not damage the pair of crimping teeth 1311 because the positions of both the upper crimping teeth 1311*a* and the lower crimping teeth 1311*b* are changed relative to the respective given positions so that the convex portions of the upper crimping teeth 1311*a* face and mesh with the concave portions of the lower crimping teeth 1311*b* while the concave portions of the upper crimping teeth 1311*a* face and mesh with the convex portions of the lower crimping teeth 1311*b* as before the phase change. In short, the pressure of the upper crimping teeth 1311*a* against the lower crimping teeth 1311*b* is not to be considered. The pressure of the upper crimping teeth 1311*a* against the lower crimping teeth 1311*b* may be adjusted to be greater or smaller in the present embodiment than in the second embodiment.

After the change in phase corresponding to the first amount d1, the convex portions of the upper crimping teeth 1311*a* and the convex portions of the lower crimping teeth 1311*b* contact the convex portions of the sheet bundle Pb crimped and bound to double-bind the sheet bundle Pb.

Figure 16A:
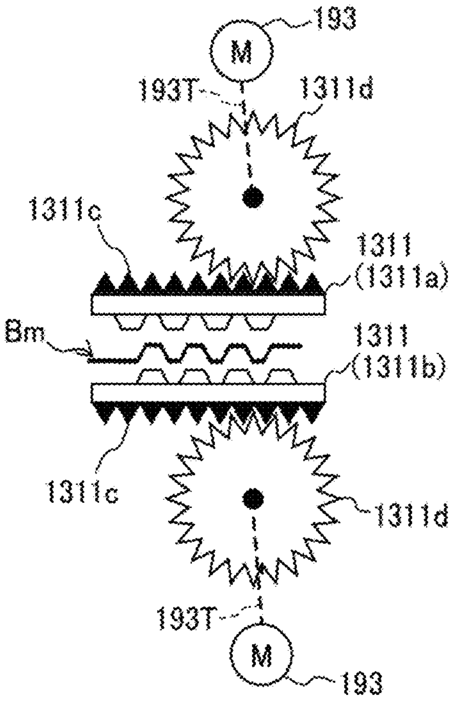
FIGS. 16A to 16E are views of a movement assembly that moves crimping teeth in a sheet processing unit according to a third embodiment of the present disclosure.
Figure 16B:
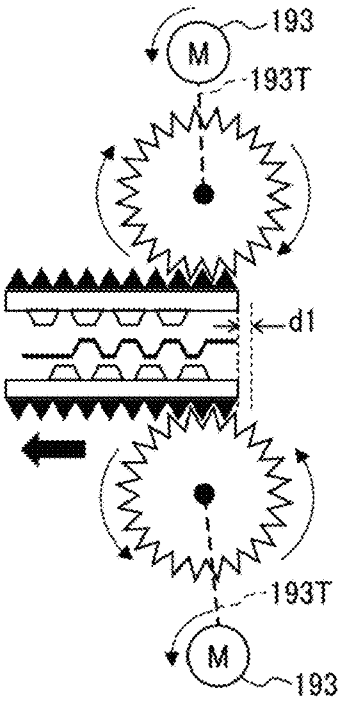
Figure 16C:
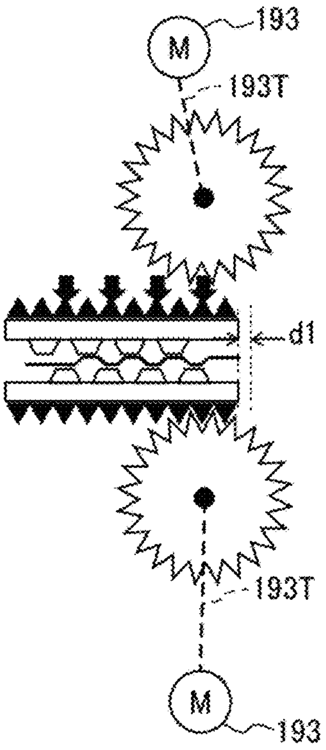
Figure 16D:
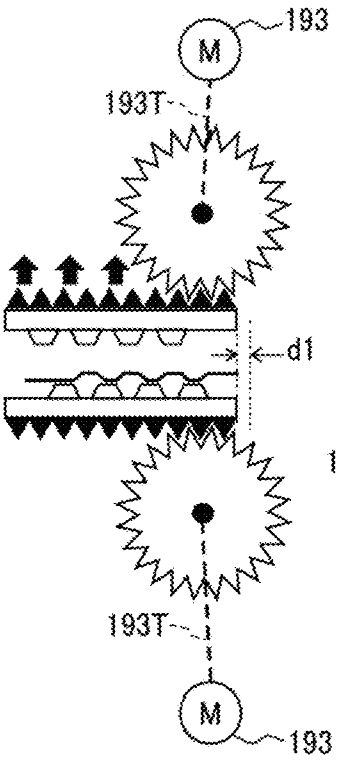
Figure 16E:
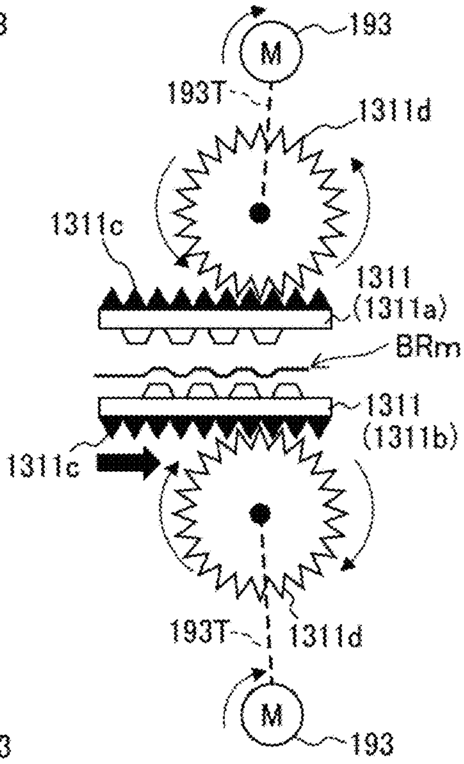

FIG. 16D illustrates the double-bound sheet bundle Pb. In other words, the unevenness of the double-bound sheet bundle Pb is smoothed. As a result, the sheet bundle Pb is easily unbound.

As described above, the sheet processing unit 1 of the present embodiment crimps and binds the sheet bundle Pb with the binding unit 130 and unbinds the sheet bundle Pb also with the binding unit 130.

Now, a description is given of the sheet processing unit 1 according to a fourth embodiment of the present disclosure.

The sheet processing unit 1 of the present embodiment unbinds, with the binding unit 130, the sheet bundle Pb crimped and bound. After unbinding the sheet bundle Pb, the sheet processing unit 1 may crimp and bind the sheet bundle Pb again. In other words, the sheet processing unit 1 may crimp and bind the sheet bundle Pb once, unbind the sheet bundle Pb, and crimp and bind the sheet Pb again. In this case, at the bound position on the sheet bundle Pb that has been crimped and bound once, the uneven shape is flattened when the sheet bundle Pb is subjected to the unbinding operation. In short, the bound and unbound position on the sheet bundle Pb is damaged.

If the crimping unit 131 faces the bound and unbound position on the sheet bundle Pb to crimp and bind the sheet bundle Pb again, the binding strength may be insufficient. To attain sufficient binding strength, the sheet bundle Pb is preferably crimped and bound again at a position different from the position once bound. According to the present embodiment, when crimping and binding the sheet bundle Pb again, the sheet processing unit 1 performs control for changing the binding position on the sheet bundle Pb to be different from the position once bound.

Figure 17:
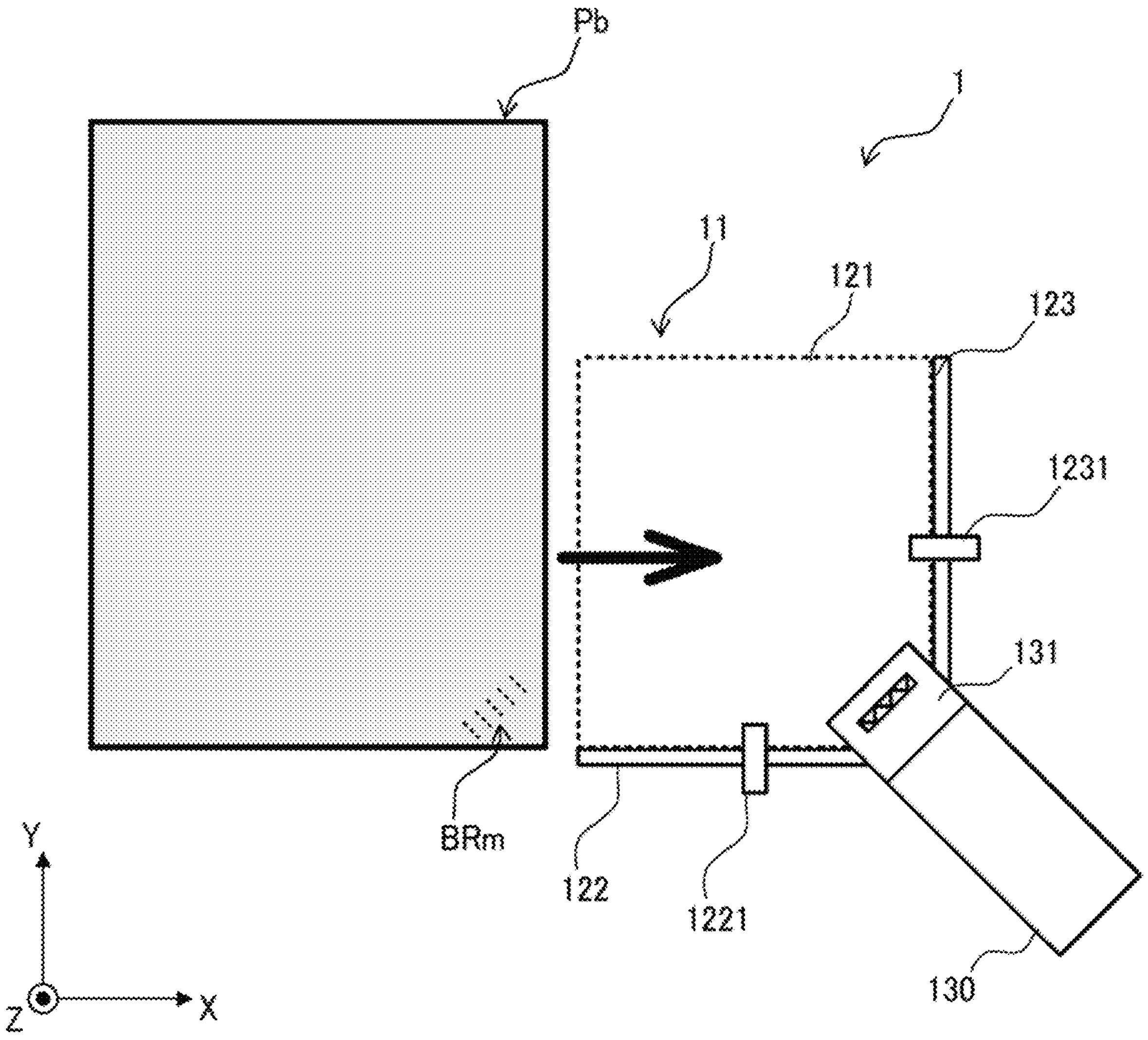
FIG. 17 is a plan view of a sheet processing unit in a rebinding operation according to a fourth embodiment of the present disclosure, with a sheet bundle to be rebound.

FIG. 17 illustrates the sheet processing unit 1 ready for rebinding the sheet bundle Pb that has been crimped and bound once and unbound as described in any one of the first to third embodiments above.

The unbinding trace BRm is formed at the end portion of the sheet bundle Pb illustrated in FIG. 17.

Figure 18:
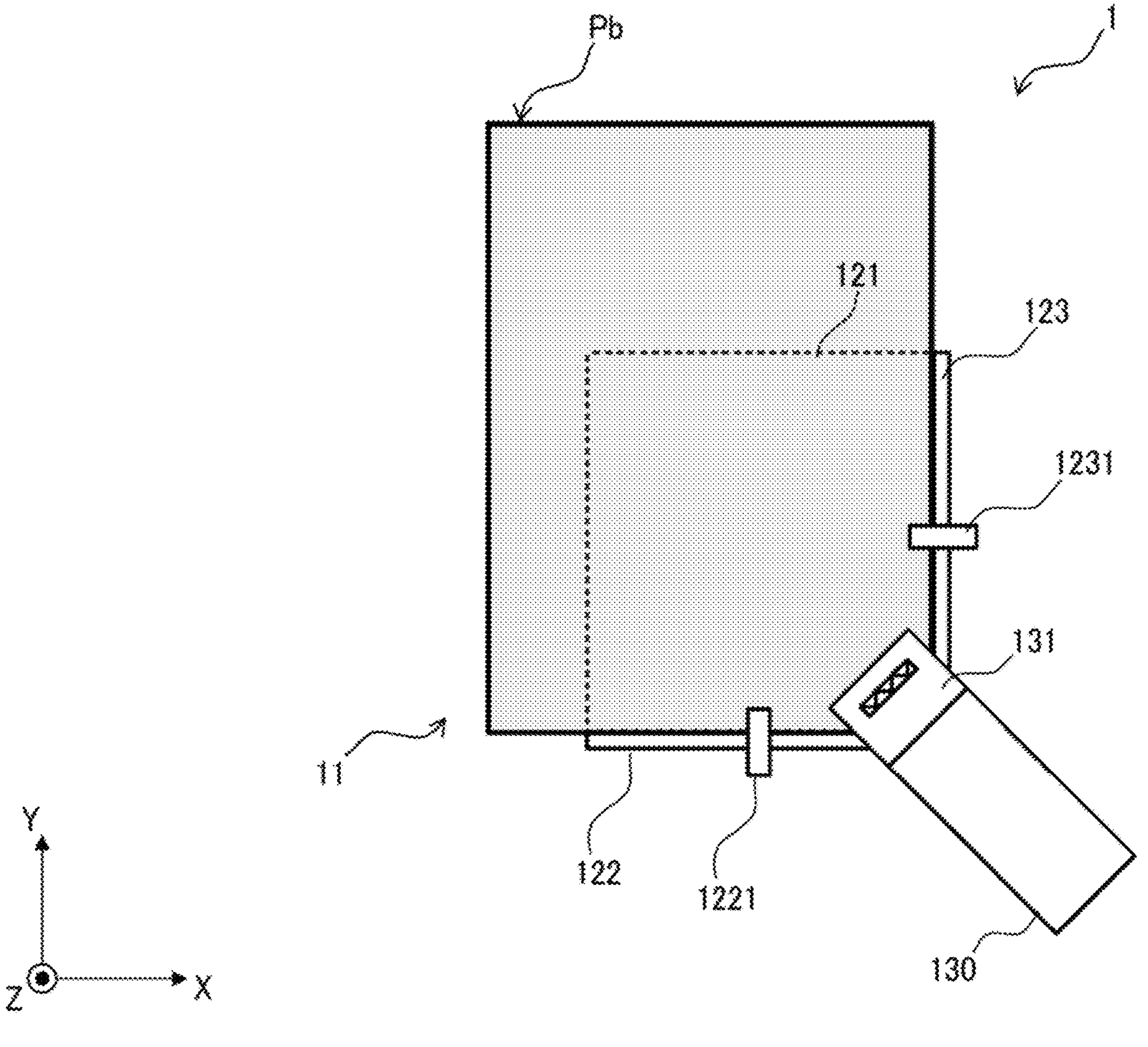
FIG. 18 is a plan view of the sheet processing unit of FIG. 17 with the sheet bundle inserted.

FIG. 18 illustrates the unbound sheet bundle Pb inserted by a user between the upper crimping teeth 1311*a* and the lower crimping teeth 1311*b*.

If the upper crimping teeth 1311*a* and the lower crimping teeth 1311*b* are engaged with each other in this state, the unbound position where the unbinding trace BRm is formed on the sheet bundle Pb matches the position of the pair of crimping teeth 1311. In other words, the unbound position on the sheet bundle Pb is crimped and bound again. In this case, the sheet bundle Pb is crimped and bound again at a portion where the uneven shape resulting from the crimp binding is flattened and damaged. Such a portion of the sheet bundle Pb is not optimum as a position to be rebound on the sheet bundle Pb.

Figure 19:
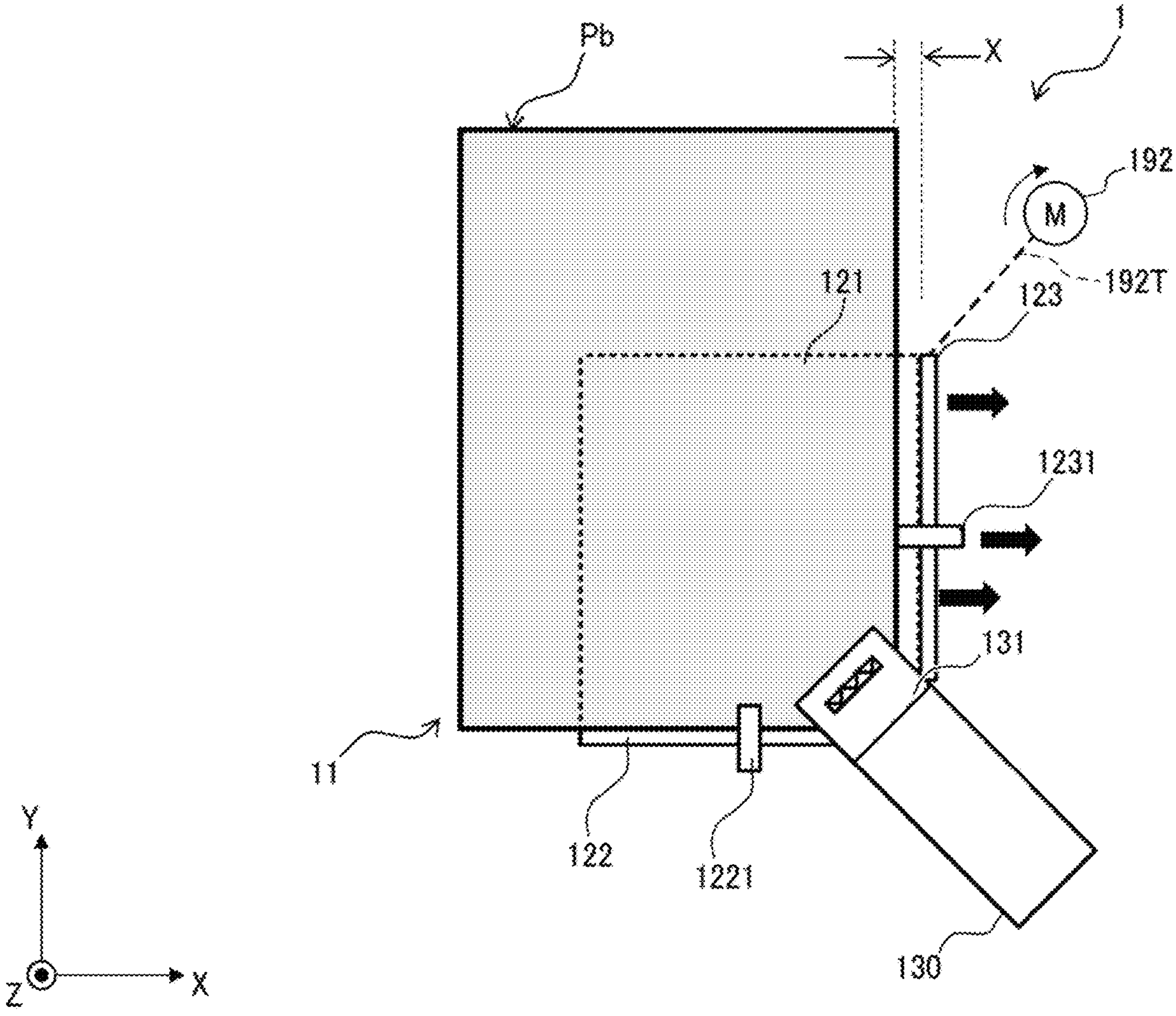
FIG. 19 is a view of the sheet processing unit of FIG. 17 in which some components are moved to change a binding position.

In the present embodiment, the sheet processing unit 1 performs the control for moving the binding position before rebinding the sheet bundle Pb. For example, before the sheet bundle Pb is inserted into the sheet insertion 11 as illustrated in FIG. 17, the user continuously presses the binding instruction button 141 twice to cause the sheet processing unit 1 to execute the control for changing the binding position. In the control for changing the binding position, when detecting that the binding instruction button 141 is pressed twice within a given period of time, the sheet processing controller 150 drives the wall movement motor 192 to change the position of the rear restraint wall 123 away from the opening of the sheet insertion 11 through which the sheet bundle Pb is inserted, as illustrated in FIG. 19.

When the user inserts the sheet bundle Pb and brings the sheet bundle Pb into contact with the side restraint wall 122 and the rear restraint wall 123 after the control for changing the binding position is completed, the sheet bundle Pb is located at a position defined by the movement of the rear restraint wall 123 by a given amount X. Thus, the position of the sheet bundle Pb is changed from the original binding position as illustrated in FIG. 20.

The binding position of the sheet bundle Pb that is moved to the position defined by the movement of the rear restraint wall 123 by the given amount X is a position moved by a distance corresponding to a second amount d2 from the original binding position where the sheet bundle Pb face the convex portions of the upper crimping teeth 1311*a* and the convex portions of the lower crimping teeth 1311*b*. In short, the position on the sheet bundle Pb is away from the original binding position by a distance corresponding to the second amount d2.

Figure 20:
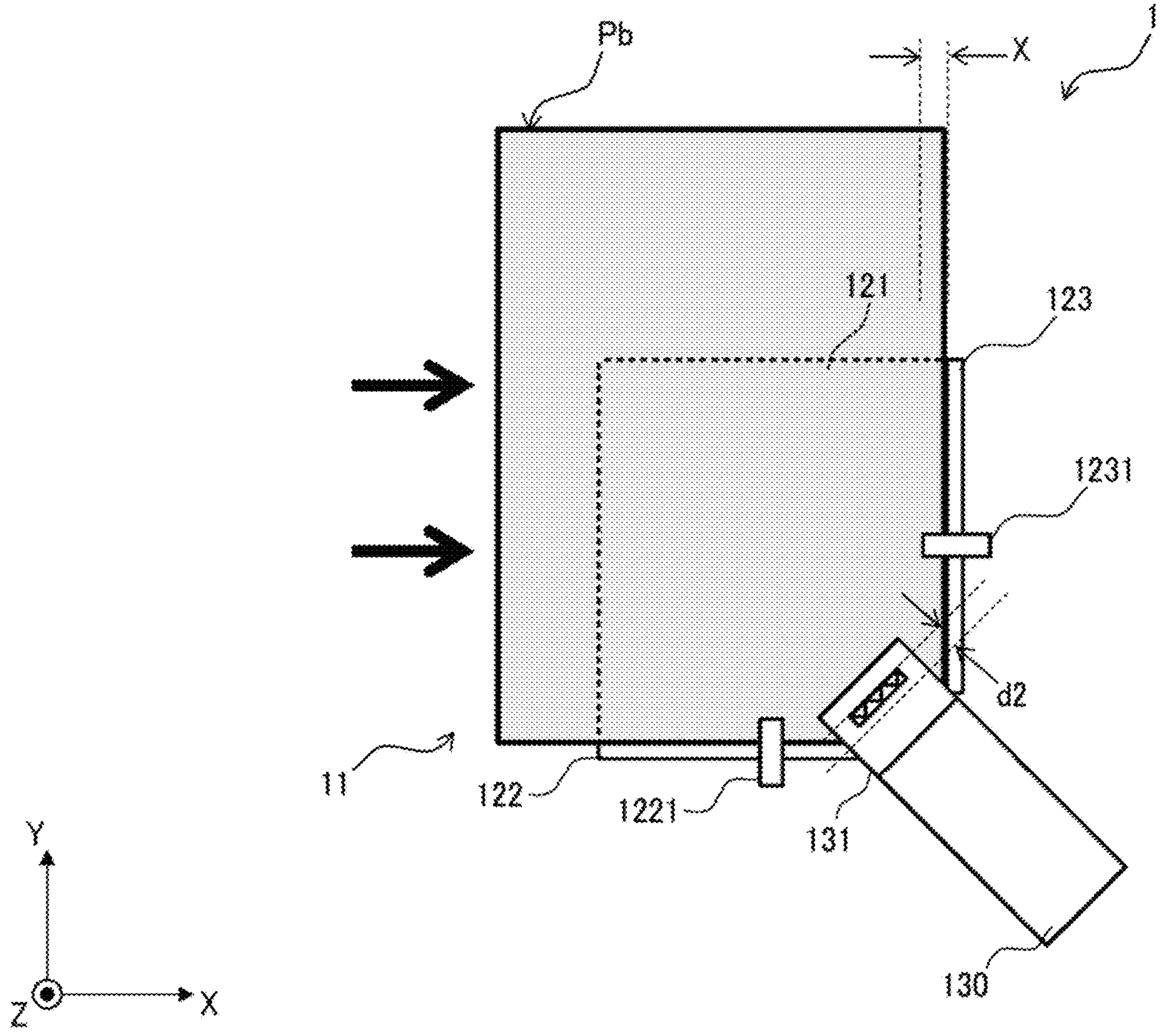
FIG. 20 is a view of the sheet processing unit of FIG. 17 in the rebinding operation.
Figure 21:
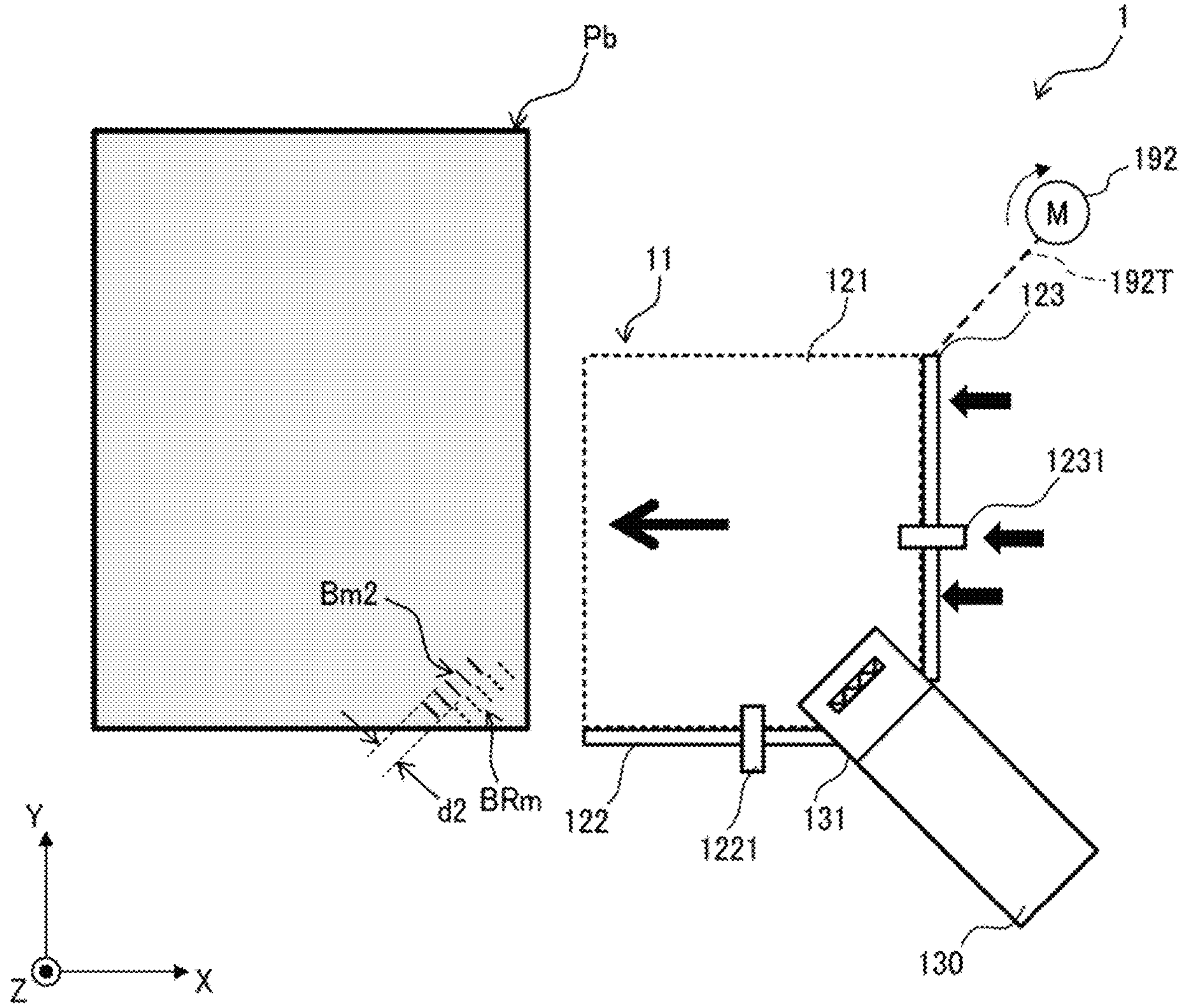
FIG. 21 is a view of the sheet processing unit of FIG. 17 with the sheet bundle rebound.

FIG. 21 illustrates the sheet processing unit 1, with the sheet bundle Pb removed from the sheet processing unit 1 after being bound by the crimping unit 131 as illustrated in FIG. 20.

As illustrated in FIG. 21, a second crimping trace Bm2 is formed at a position moved from the original binding position by a distance corresponding to the second amount d2 on the sheet bundle Pb rebound.

Figure 22:
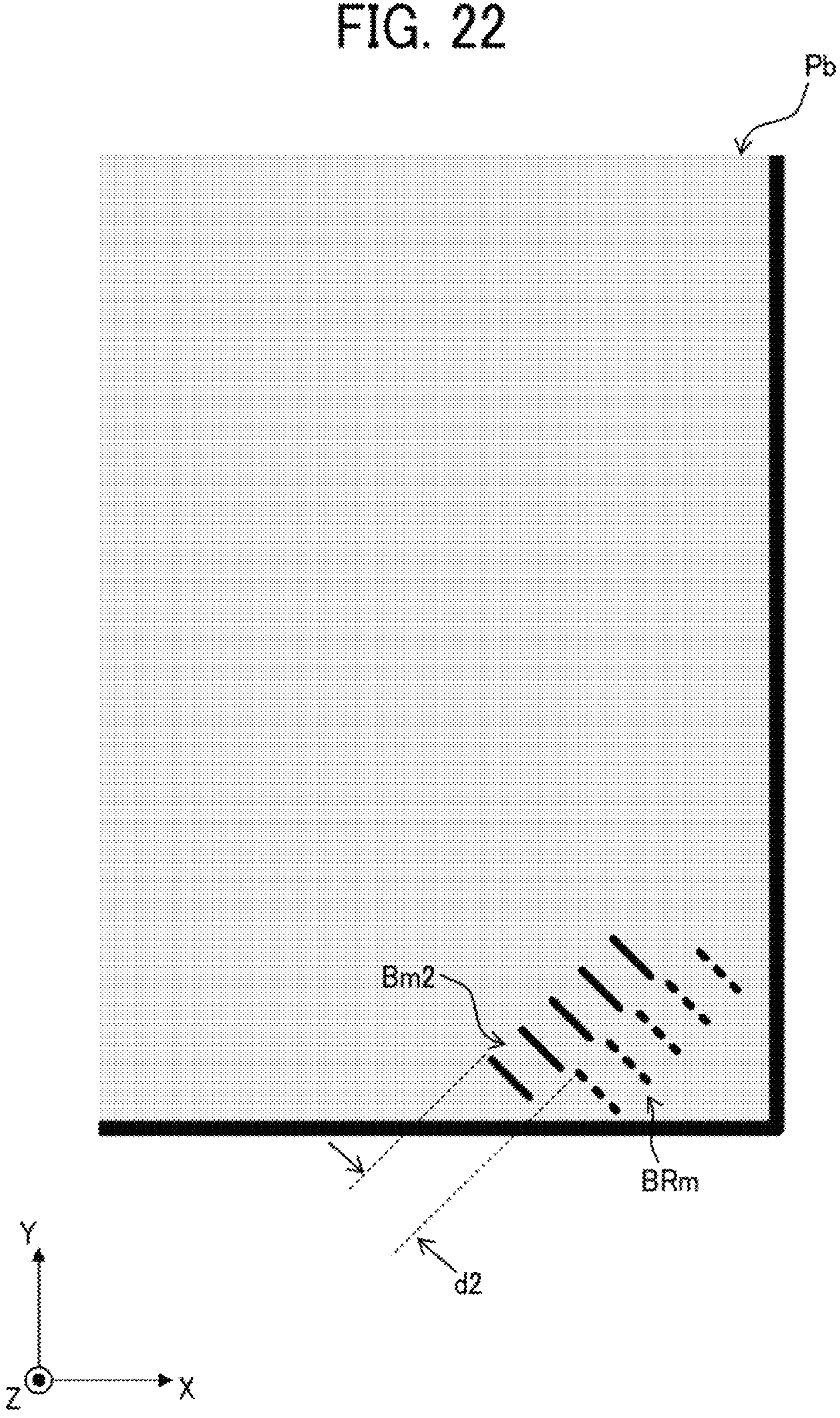
FIG. 22 is an enlarged view of the sheet bundle after the rebinding operation.

FIG. 22 illustrates the sheet bundle Pb rebound according to the present embodiment.

As illustrated in FIG. 22, the second crimping trace Bm2 is formed at the position moved from the unbinding trace BRm by the distance corresponding to the second amount d2. In other words, the rebound position on sheet bundle Pb is a portion where sufficient binding strength is obtained, other than the portion where the uneven shape resulting from the crimp binding is flattened to form the unbinding trace BRm and where the strength is reduced.

As described above, the sheet processing unit 1 of the fourth embodiment uses the binding unit 130 to unbind the sheet bundle Pb and then crimp and bind the sheet bundle Pb again with sufficient binding strength.

First, the user presses the binding instruction button 141 twice. In response, the sheet processing unit 1 executes an operation as below provided that the time interval between the first and second presses is a given time. The image processing controller 350 receives a control signal notifying the image processing controller 350 that the user has pressed the binding instruction button 141. The image processing controller 350 transmits a control signal to the sheet processing controller 150 to cause the sheet processing controller 150 to move the rear restraint wall 123 by the given amount X.

In response to the control signal from the image processing controller 350, the sheet processing controller 150 drives the wall movement motor 192 to cause the given-amount movement of the rear restraint wall 123. The given-amount movement of the rear restraint wall 123 also causes the given-amount movement of the sheet rear-end sensor 1231. When the given-amount movement of the rear restraint wall

123 is completed, the sheet processing controller 150 transmits a control signal to the image processing controller 350 to notify the image processing controller 350 that the given-amount movement is completed.

In response to the control signal, the image processing controller 350 outputs, on the display 310*a* of the control panel 310, a message prompting the user to insert the sheet bundle Pb to be rebound to the end of the sheet insertion 11.

When the user inserts the sheet bundle Pb and brings the sheet bundle Pb into contact with the side restraint wall 122 and the rear restraint wall 123, the sheet bundle Pb is inserted in the gap between the upper crimping teeth 1311*a* and the lower crimping teeth 1311*b*. As a result, the sheet side-end sensor 1221 and the sheet rear-end sensor 1231 detect the sheet bundle Pb. The sheet processing controller 150 transmits a control signal to the image processing controller 350 to notify the image processing controller 350 that the rebinding is executable.

According to the control signal from the sheet processing controller 150, the image processing controller 350 outputs, on the display 310*a*, a message indicating that "rebinding is executable."

After confirming the message on the display 310*a*, the user presses the binding instruction button 141 again. When the binding instruction button 141 is pressed, the sheet processing controller 150 transmits to the image processing controller 350 a control signal notifying the image processing controller 350 of a binding instruction. In response to the control signal, the image processing controller 350 transmits a control signal to the sheet processing controller 150 to cause the sheet processing controller 150 to start the rebinding.

After receiving the control signal from the image processing controller 350, the sheet processing controller 150 operates the crimping motor 191 that moves the upper crimping teeth 1311*a*, to move down the upper crimping teeth 1311*a* and rebind the sheet bundle Pb as illustrated in FIG. 8B.

After the sheet bundle Pb is thus rebound, the sheet processing controller 150 operates the crimping motor 191 to move up the upper crimping teeth 1311*a* as illustrated in FIG. 8C.

Thereafter, the user pulls out the sheet bundle Pb from the sheet insertion 11. The sheet side-end sensor 1221 and the sheet rear-end sensor 1231 no longer detect the sheet bundle Pb. The sheet processing controller 150 then drives the wall movement motor 192 to return the rear restraint wall 123 to the original position as illustrated in FIG. 21.

FIG. 22 illustrates the sheet bundle Pb rebound according to the present embodiment.

As illustrated in FIG. 22, the second crimping trace Bm2 is formed at the position moved from the unbinding trace BRm by the distance corresponding to the second amount d2. The second crimping trace Bm2 offset from the unbinding trace BRm helps the sheet bundle Pb that has been unbound once to keep sufficient binding strength.

Now, a description is given of the sheet processing unit 1 according to a fifth embodiment of the present disclosure.

Figure 23:
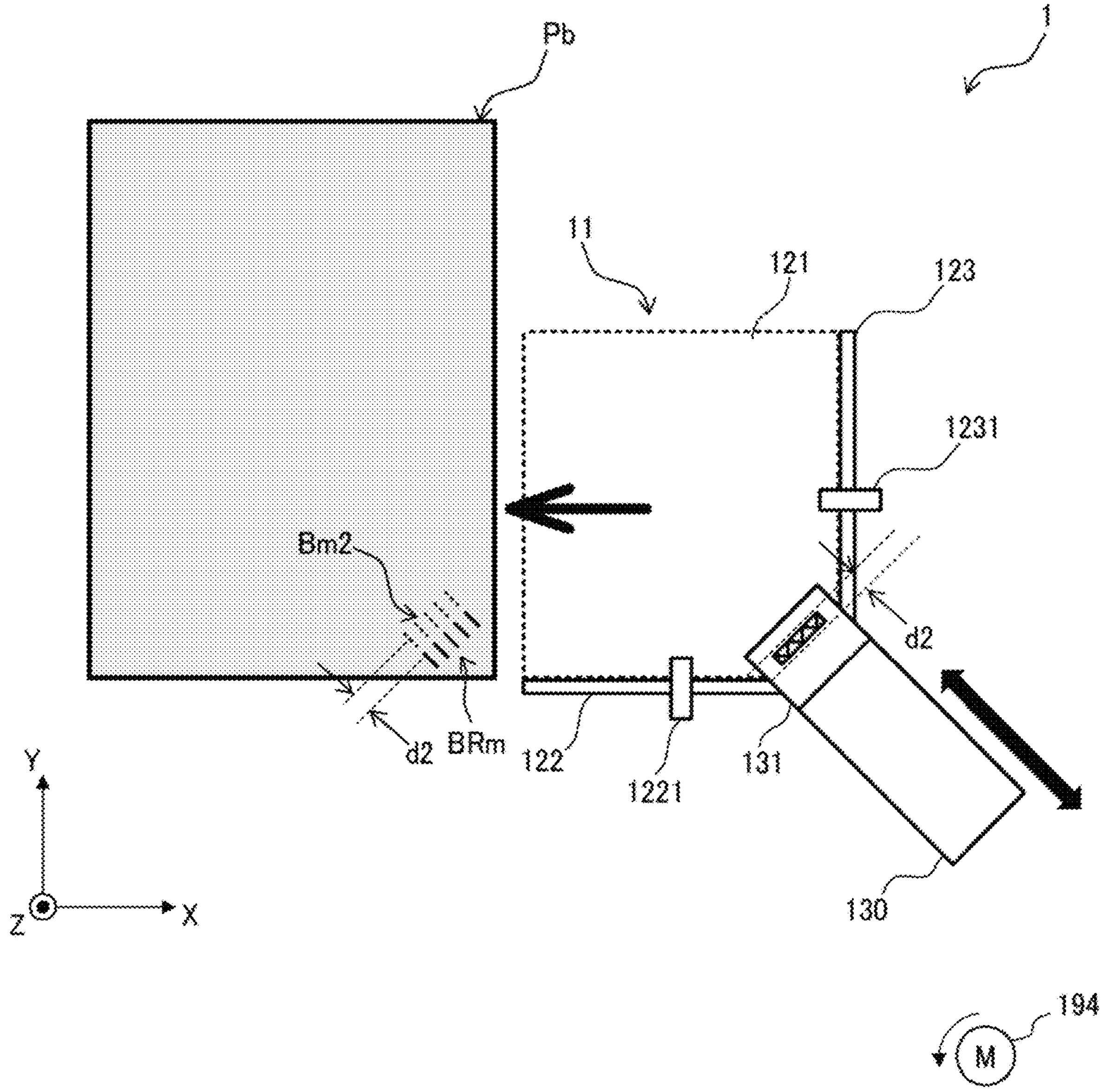
FIG. 23 is a plan view of a sheet processing unit according to a fifth embodiment of the present disclosure, with a sheet bundle to be rebound.

In the sheet processing unit 1 of the present embodiment, the binding unit 130 including the crimping unit 131 can move toward and away from the sheet insertion 11 as indicated by the double-headed arrow in FIG. 23. The binding unit 130 is moved by a driving force of a unit movement motor 194. The unit movement motor 194 is controlled by the sheet processing controller 150.

As illustrated in FIG. 23, the binding unit 130 is held to move by the distance corresponding to the second amount d2. The movement of the binding unit 130 by the distance corresponding to the second amount d2 moves the pair of crimping teeth 1311 to a position where the pair of crimping teeth 1311 does not overlap the unbinding trace BRm.

Figure 24:
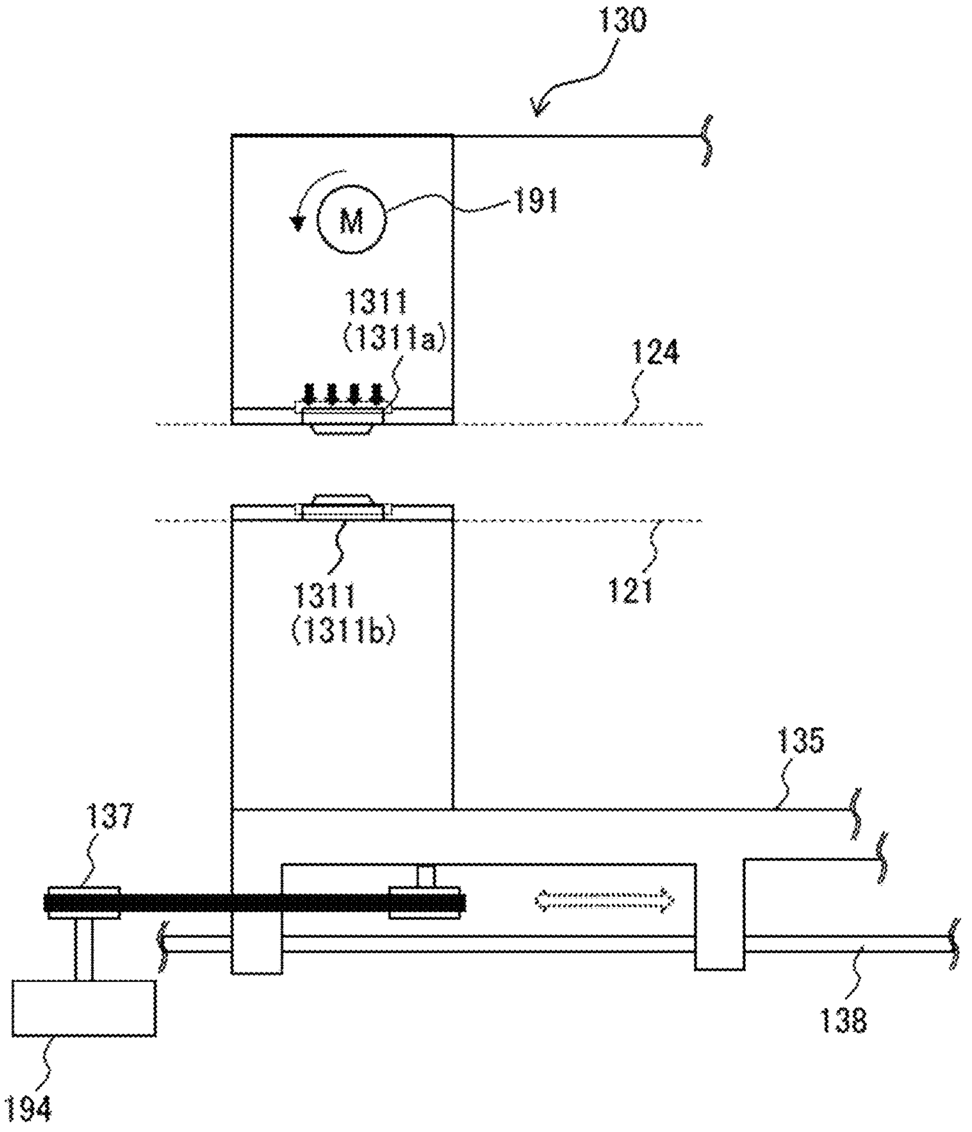
FIG. 24 is a view of a binding unit included in the sheet processing unit of FIG. 23, as viewed in the direction indicated by arrow A of FIG. 6.

FIG. 24 is a view of the binding unit 130 according to the present embodiment, as viewed in the direction B of FIG. 6.

The binding unit 130 of the present embodiment includes a crimping base 135 at the bottom. The crimping unit 131 is disposed on the crimping base 135.

The crimping base 135 is moved in directions indicated by the broken double-headed arrow in FIG. 24 along a movement guide shaft 138, by the driving force transmitted via a power transmitter 137 from the unit movement motor 194 that is disposed outside the crimping unit 131. Thus, the unit movement motor 194 and the power transmitter 137 function together as a movement assembly. The movement of the crimping base 135 moves the crimping unit 131 by the distance corresponding to the second amount d2 to rebind the sheet bundle Pb at the position where the pair of crimping teeth 1311 does not overlap the unbound portion of the sheet bundle Pb.

Now, a description is given of a flow of the rebinding operation performed by the crimping unit 131 of the present embodiment after the unbinding operation.

First, a user inserts the unbound sheet bundle Pb between the upper crimping teeth 1311*a* and the lower crimping teeth 1311*b*.

When the sheet side-end sensor 1221 and the sheet rear-end sensor 1231 detect the sheet bundle Pb, the sheet processing controller 150 transmits to the image processing controller 350 a control signal indicating that the offline crimp binding, the unbinding, and the offline crimp rebinding are executable. After receiving the control signal, the image processing controller 350 outputs, on the display 310*a*, a message notifying the user that the offline crimp binding, the unbinding, and the offline crimp rebinding are executable. For example, for the rebinding, the image processing controller 350 outputs, on the display 310*a*, a message prompting the user to press the binding instruction button 141 twice.

After confirming the message on the display 310*a*, the user presses the binding instruction button 141 twice. When the user presses the binding instruction button 141 twice, the sheet processing controller 150 transmits to the image processing controller 350 a control signal indicating that the user has pressed the binding instruction button 141 twice. In response to the control signal, the image processing controller 350 transmits a control signal to the sheet processing controller 150 to cause the sheet processing controller 150 to start the rebinding. After receiving the control signal, the sheet processing controller 150 operates the unit movement motor 194. The unit movement motor 194 moves the crimping unit 131 by the second amount d2 toward the position where the pair of crimping teeth 1311 does not overlap the unbound portion of the sheet bundle Pb, to rebind the sheet bundle Pb.

After rebinding the sheet bundle Pb, the sheet processing controller 150 operates the unit movement motor 194 to return the crimping unit 131 to the original position where the crimping unit 131 stands before moving by the second amount d2. By the above operation, the sheet processing unit 1 crimps and binds a position distanced from the unbound position on the sheet bundle Pb again.

Now, a description is given of the sheet processing unit 1 according to a sixth embodiment of the present disclosure.

Figure 25:
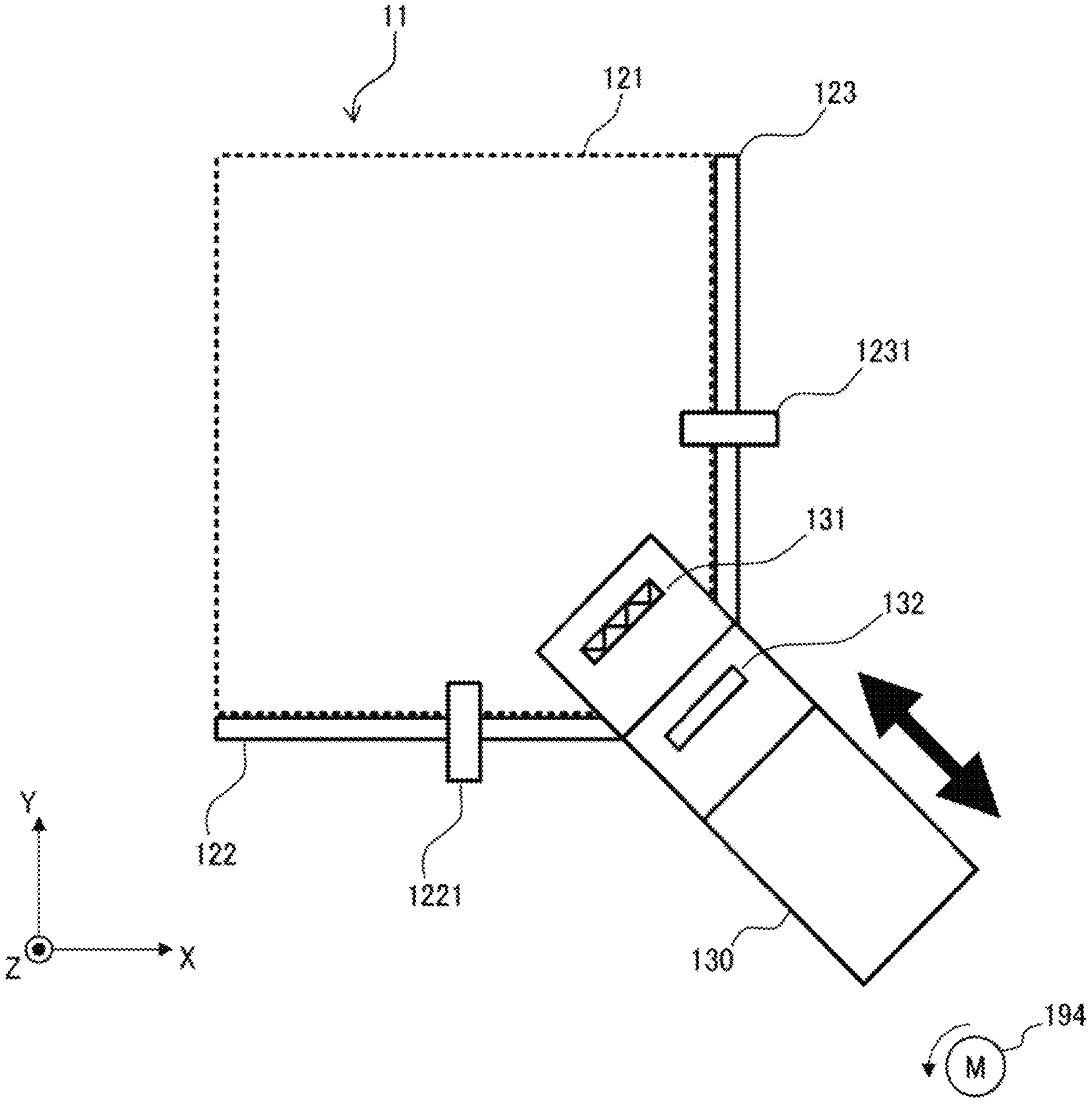
FIG. 25 is a plan view of a sheet processing unit according to a sixth embodiment of the present disclosure.

In the sheet processing unit 1, the binding unit 130 including the crimping unit 131 can move toward and away from the sheet insertion 11 as indicated by the double-headed arrow in FIG. 25. The binding unit 130 includes a pressure plate unit 132 in addition to the crimping unit 131.

Figure 26A:
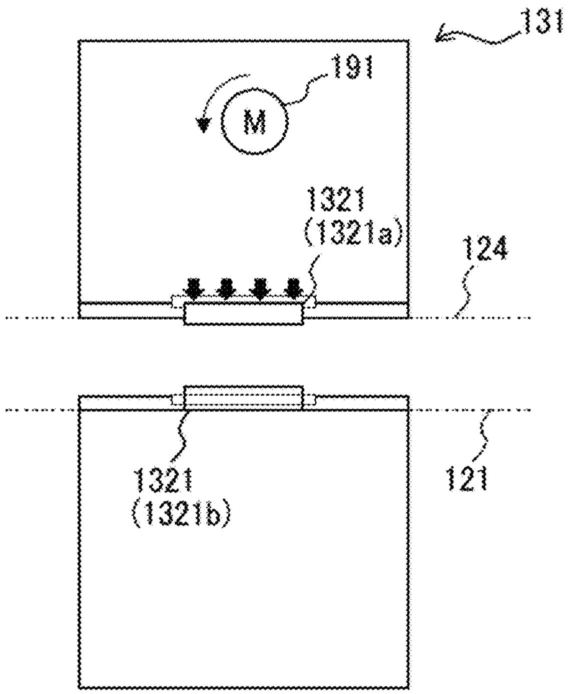
FIG. 26A is a view of a binding unit included in the sheet processing unit of FIG. 25, as viewed in the direction indicated by arrow A of FIG. 6.

FIG. 26A is a view of the binding unit 130 according to the present embodiment, as viewed in the direction A of FIG. 6.

Figure 26B:
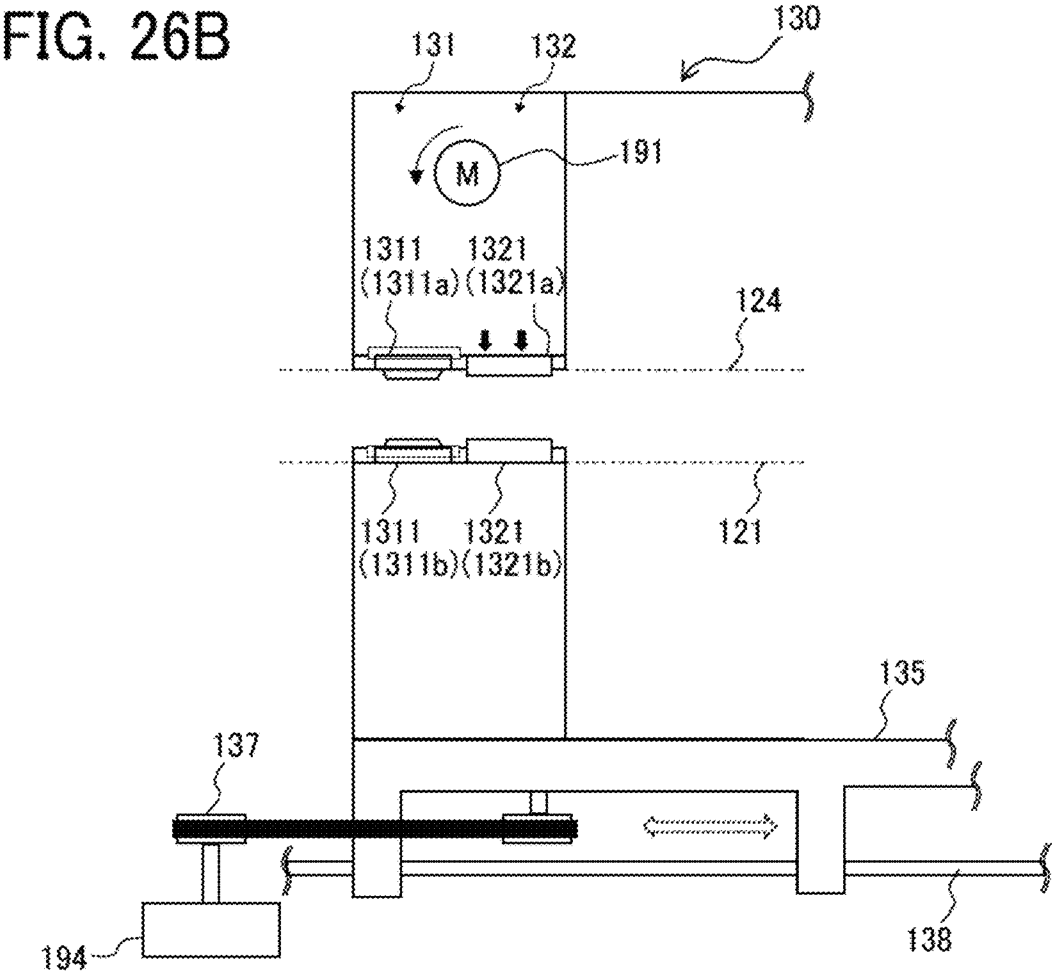
FIG. 26B is a view of the binding unit, as viewed in the direction indicated by arrow B of FIG. 6.

FIG. 26B is a view of the binding unit 130 according to the present embodiment, as viewed in the direction B of FIG. 6.

As illustrated in FIG. 26B, the binding unit 130 includes the pressure plate unit 132 adjacent to the crimping unit 131. The pressure plate unit 132 includes a pair of pressure plates 1321 that is constructed of an upper pressure plate 1321*a* and a lower pressure plate 1321*b*. The crimping unit 131 includes the pair of crimping teeth 1311 that sandwiches the sheet bundle Pb. On the other hand, the pressure plate unit 132 includes the pair of pressure plates 1321 (i.e., the upper pressure plate 1321*a* and the lower pressure plate 1321*b*) as flat plate teeth.

The upper pressure plate 1321*a* and the lower pressure plate 1321*b* are flat plates, which receive the driving force of the crimping motor 191 to sandwich the sheet bundle Pb. In the unbinding operation, the pair of pressure plates 1321 is used in place of the pair of crimping teeth 1311 to flatten the crimping trace Bm and weaken the binding force between the sheets P to facilitate the unbinding of the sheet bundle Pb.

Since the pressure plate unit 132 is disposed on the crimping base 135 like the crimping unit 131, the pressure plate unit 132 is moved in the directions indicated by the broken double-headed arrow in FIG. 26B along the movement guide shaft 138, by the driving force transmitted via the power transmitter 137 from the unit movement motor 194 that is disposed outside the crimping unit 131.

The movement of the crimping base 135 moves the pressure plate unit 132 to the position where the pressure plate unit 132 faces the crimping trace Bm. At the position, the driving force of the crimping motor 191 causes the upper pressure plate 1321*a* and the lower pressure plate 1321*b* to press the crimping trace Bm to unbind the sheet bundle Pb.

Although FIG. 26B illustrates the pressure plate unit 132 adjacent to the crimping unit 131, the pressure plate unit 132 may be disposed in a housing separate from the crimping unit 131.

Regardless of whether the pressure plate unit 132 is integrated with or separated from the crimping unit 131, the crimping motor 191 serves as a common driving source for the crimping unit 131 and the pressure plate unit 132, which downsizes the binding unit 130 and reduces the cost as compared with a binding unit that includes a plurality of driving sources for a crimping unit and a pressure plate unit.

Now, a description is given of the sheet processing unit 1 according to a seventh embodiment of the present disclosure.

Figure 27:
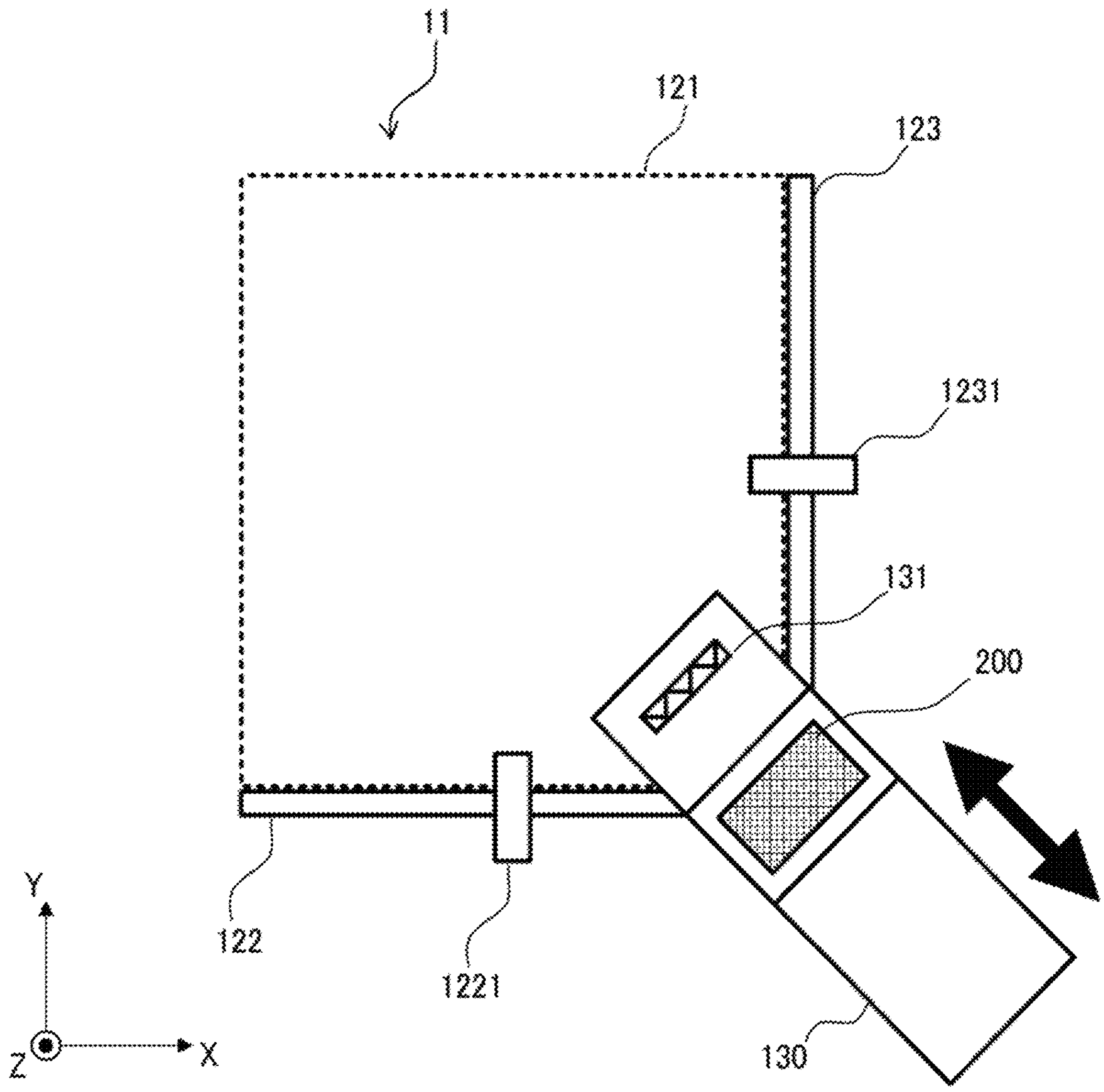
FIG. 27 is a plan view of a sheet processing unit according to a seventh embodiment of the present disclosure.

In the sheet processing unit 1 of the present embodiment, the binding unit 130 including the crimping unit 131 can move toward and away from the sheet insertion 11 as indicated by the double-headed arrow in FIG. 27. The binding unit 130 includes a liquid applying unit 200 in addition to the crimping unit 131.

Figure 28:
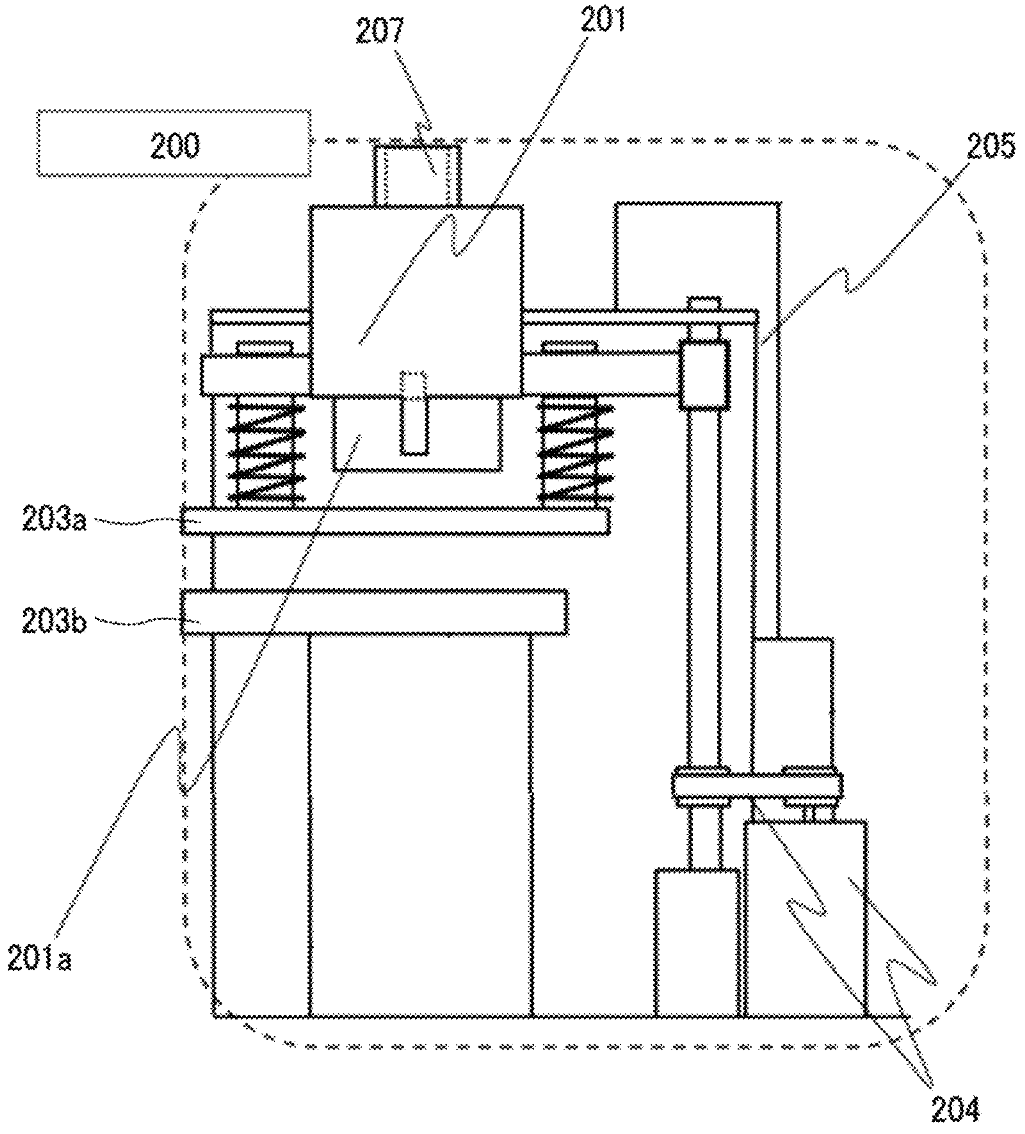
FIG. 28 is a view of a liquid applying unit included in the sheet processing unit of FIG. 27.

FIG. 28 is a view of the liquid applying unit 200 included in the binding unit 130 according to the present embodiment, as viewed in the direction A of FIG. 6.

Figure 29:
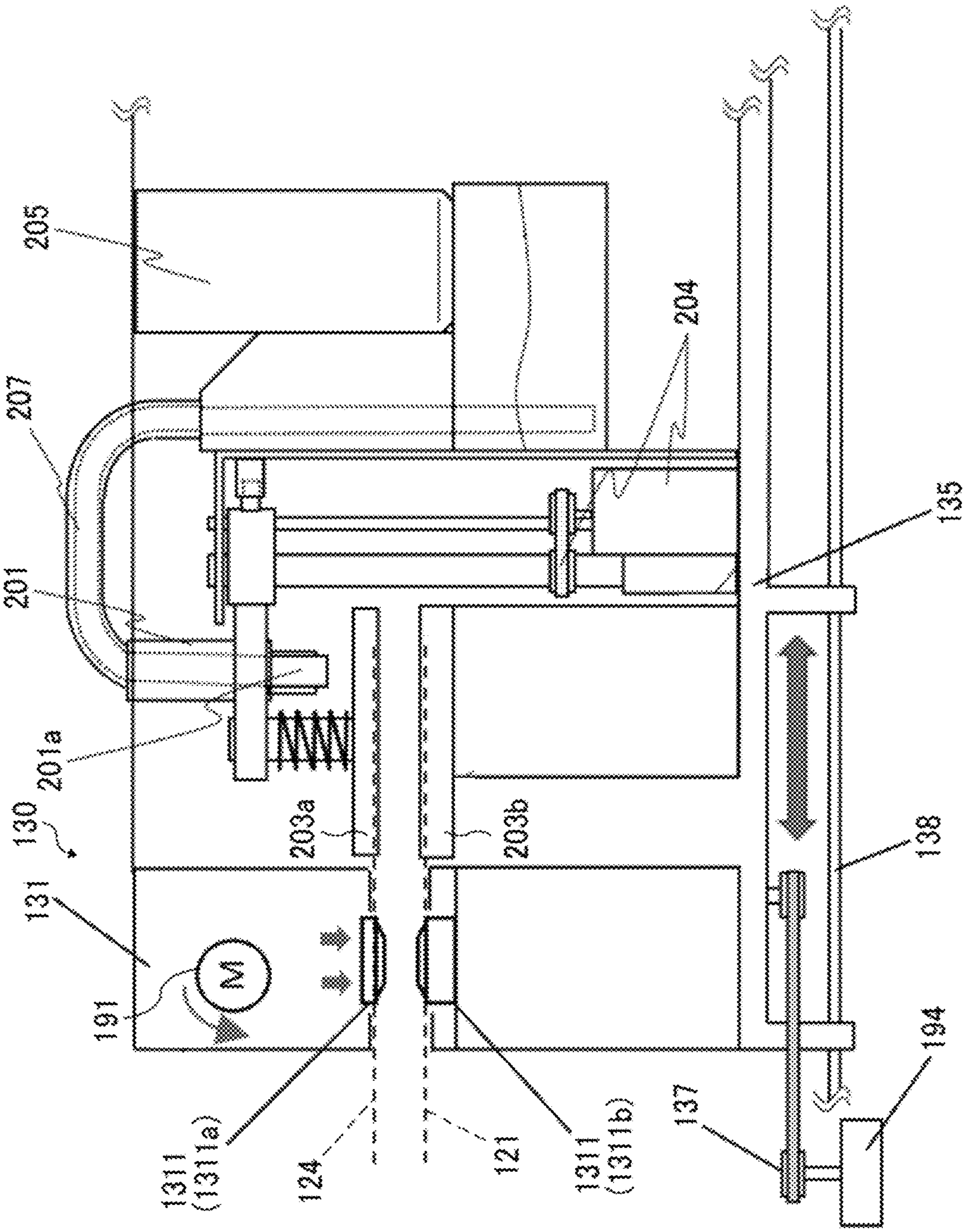
FIG. 29 is a view of a binding unit included in the sheet processing unit of FIG. 27.

FIG. 29 is a view of the binding unit 130 according to the present embodiment, as viewed in the direction B of FIG. 6.

As illustrated in FIGS. 28 and 29, the liquid applying unit 200 includes a liquid applying assembly 201, a liquid storage 205, and an elevation assembly 204 including an elevation motor. The liquid applying assembly 201 applies liquid such as water. The liquid storage 205 stores the liquid. The elevation assembly 204 moves the liquid applying assembly 201. The liquid applying assembly 201 includes a liquid applier 201*a* that retains the liquid. The liquid stored in the liquid storage 205 is supplied to the liquid applying assembly 201 via a supplier 207 so that the liquid applier 201*a* retains the liquid.

Before crimping and binding the sheet bundle Pb, the binding unit 130 is moved to move the liquid applying unit 200 to a position where the liquid applying unit 200 faces the binding position on the sheet P or the sheet bundle Pb. When the elevation assembly 204 moves down the liquid applying assembly 201, a pressure applier 203*a* contacts the sheet P or the sheet bundle Pb placed on a platen 203*b*. Then, the elevation assembly 204 further moves down the liquid applying assembly 201 to cause the liquid applier 201*a* to apply the liquid to the sheet P or the sheet bundle Pb. Since the liquid applier 201*a* applies the liquid while the sheet P or the sheet bundle Pb is pressed between the pressure applier 203*a* and the platen 203*b*, the liquid applier 201*a* can apply the liquid to a target position with accuracy.

After the liquid applier 201*a* applies the liquid to the sheet P or the sheet bundle Pb, the crimping unit 131 crimps and binds the sheet bundle Pb. Since the liquid is applied to the sheet bundle Pb before the sheet bundle Pb is crimped and bound, the fibers of the sheets P are easily entangled with each other when the sheet bundle Pb is crimped and bound. Thus, the sheets P are crimped with enhanced strength.

As described above, the sheet processing unit 1 of the present embodiment changes how the convex portions of the pair of crimping teeth 1311 face the uneven shape of the crimping trace Bm on the sheet bundle Pb to facilitate the unbinding or removal of the sheets P from the sheet bundle Pb crimped and bound. In addition, after applying the liquid to the sheet bundle Pb, the sheet processing unit 1 rebinds the unbound sheet bundle Pb to enhance the binding strength.

Figure 30:
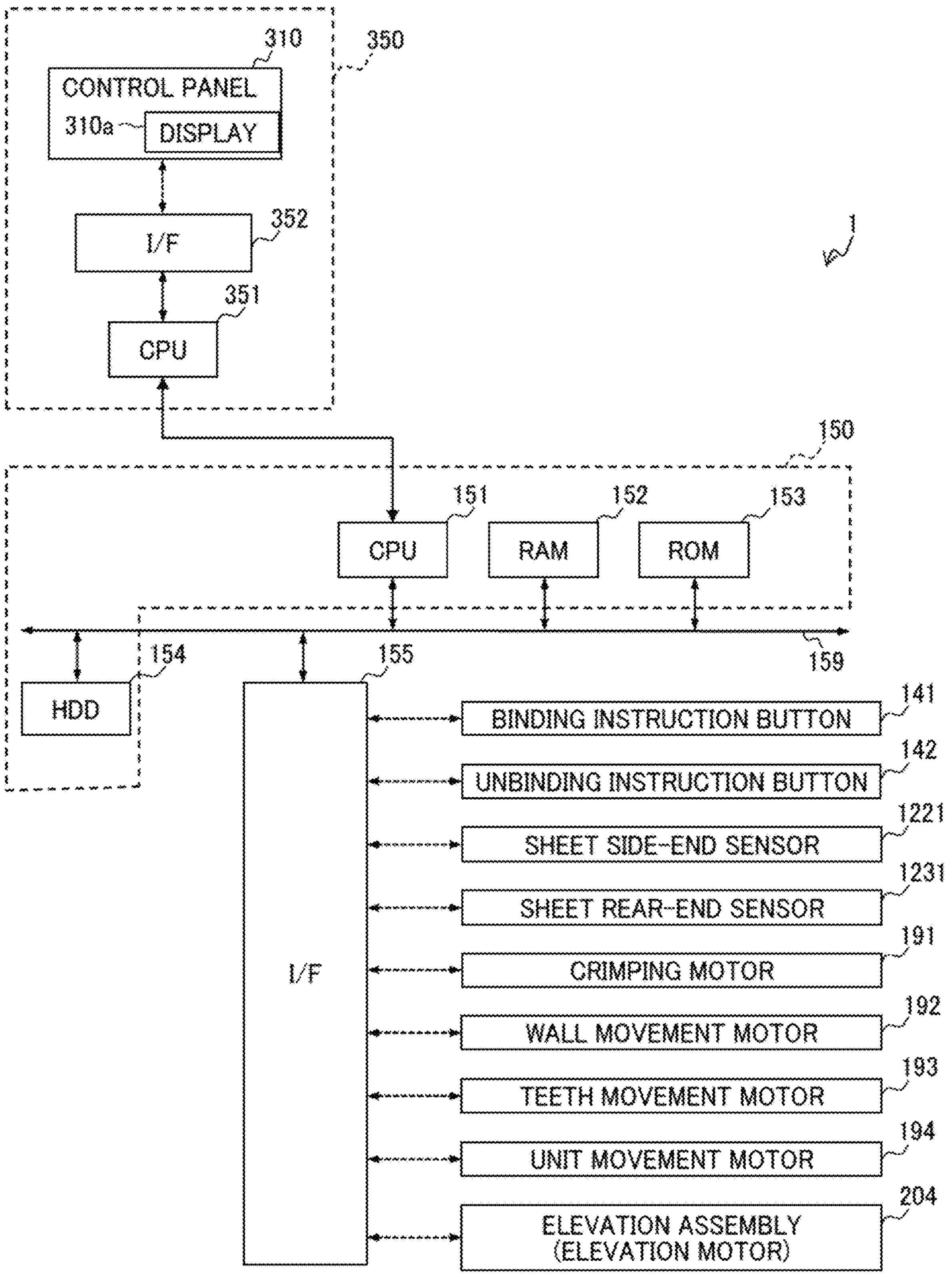
FIG. 30 is a functional block diagram of controllers included in the sheet processing unit according to the above embodiments of the present disclosure.

Referring now to the block diagram illustrated in FIG. 30, a description is given of the sheet processing controller 150 that controls the operations of the sheet processing unit 1.

A description is also given of the image processing controller 350 that executes control processing in cooperation with the sheet processing controller 150.

As illustrated in FIG. 30, the sheet processing controller 150 includes a central processing unit (CPU) 151, a random access memory (RAM) 152, a read only memory (ROM) 153, a hard disk drive (HDD) 154, and an interface (I/F) 155, which are connected via a common bus 159.

The CPU 151 is an arithmetic unit and controls the overall operation of the sheet processing unit 1. The RAM 152 is a volatile storage medium that allows data to be read and written at high speed. The CPU 151 uses the RAM 152 as a work area for data processing. The ROM 153 is a read-only non-volatile storage medium that stores programs such as firmware. The HDD 154 is a non-volatile storage medium that allows data to be read and written and has a relatively large storage capacity. The HDD 154 stores, for example, an operating system (OS), various control programs, and application programs.

By an arithmetic function of the CPU 151, the sheet processing unit 1 processes, for example, a control program stored in the ROM 153 and an information processing program (application program) loaded into the RAM 152 from a storage medium such as the HDD 154. Such processing configures a software controller including various functional modules of the sheet processing unit 1.

The software controller thus configured cooperates with hardware resources of the sheet processing unit 1 to construct functional blocks that implement functions of the sheet processing unit 1. In other words, the CPU 151, the RAM 152, the ROM 153, and the HDD 154 function as the sheet processing controller 150 to control the operations of the sheet processing unit 1 such as crimp binding, liquid application and crimp binding, unbinding, rebinding (or second crimp binding), and liquid application and rebinding operations.

The I/F 155 is an interface that connects the binding instruction button 141, the unbinding instruction button 142, the sheet side-end sensor 1221, the sheet rear-end sensor 1231, the crimping motor 191, the wall movement motor 192, the teeth movement motor 193, the unit movement motor 194, and the elevation assembly 204 to the common bus 159. The sheet processing controller 150 operates the crimping motor 191, the wall movement motor 192, the teeth movement motor 193, the unit movement motor 194, and the elevation assembly 204 through the I/F 155.

The image processing controller 350 has substantially the same hardware configuration as that of the sheet processing controller 150. FIG. 30 illustrates a CPU 351, an I/F 352, and the control panel 310 as representative components of the image processing controller 350.

The control panel 310 includes an operation unit that receives instructions from a user and a display (i.e., the display 310*a*) that notifies the user of information. The operation unit includes, for example, hard keys and a touch panel superimposed on the display (i.e., the display 310*a*). The control panel 310 acquires information from the user through the operation unit and provides information to the user through the display (i.e., the display 310*a*).

The control method that is performed by the sheet processing controller 150 is implemented by the cooperation of the hardware resources of a computer and programs as computer software as described above. In other words, the control method is executed by the computer that causes an arithmetic device, a storage device, an input device, an output device, and a control device to operate in cooperation with each other based on a program. The program may be written in, for example, a storage device or a storage medium and distributed. Alternatively, the program may be distributed through, for example, an electric communication line.

According to one aspect of the present disclosure, the medium processing device crimps and binds a sheet bundle with a crimp binding assembly and unbinds the sheet bundle with the crimp binding assembly.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. It is therefore to be understood that the disclosure of this patent specification may be practiced otherwise by those skilled in the art than as specifically described herein and such modifications and alternatives are within the technical scope of the appended claims.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A medium processing device comprising:

a plurality of crimping teeth configured to:

press and deform a position on a sheet bundle to bind the sheet bundle, the sheet bundle being a bundle of stacked sheet-shaped media; and flatten the position pressed and deformed to unbind the sheet bundle; and circuitry configured to cause the plurality of crimping teeth to sandwich the position on the sheet bundle.

2. The medium processing device according to claim 1, further comprising a position changing assembly configured to change a phase between an uneven shape of the sheet bundle pressed and deformed and an uneven shape of the plurality of crimping teeth to change relative positions of the sheet bundle and the plurality of crimping teeth, and flatten the uneven shape of the sheet bundle with the plurality of crimping teeth to unbind the sheet bundle.

3. The medium processing device according to claim 2, further comprising a sheet-insertion restraint wall, wherein the position changing assembly is configured to move the sheet-insertion restraint wall to change the phase and unbind the sheet bundle.

4. The medium processing device according to claim 2, wherein the position changing assembly is configured to move the plurality of crimping teeth to change the phase and unbind the sheet bundle.

5. The medium processing device according to claim 1, wherein the plurality of crimping teeth is configured to bind the sheet bundle, unbind the sheet bundle bound, and rebind the sheet bundle unbound.

6. The medium processing device according to claim 5, wherein the plurality of crimping teeth is configured to rebind a position on the sheet bundle different from a position once bound on the sheet bundle.

7. The medium processing device according to claim 1, further comprising a liquid applying assembly configured to apply liquid to the position on the sheet bundle before the plurality of crimping teeth binds the sheet bundle.

8. The medium processing device according to claim 1, wherein the plurality of crimping teeth is configured to:

bind the sheet bundle off-line; and unbind the sheet bundle off-line.

9. An image forming apparatus comprising:

an image forming device configured to form an image on a sheet-shaped medium; and the medium processing device according to claim 1, the medium processing device including the plurality of crimping teeth configured to press and deform the position on the sheet bundle to bind the sheet bundle, the sheet bundle being a bundle of sheet-shaped media on each of which the image is formed.

10. A medium processing device comprising:

a plurality of crimping teeth configured to press and deform a position on a sheet bundle to bind the sheet bundle, the sheet bundle being a bundle of stacked sheet-shaped media;

a plurality of flat plate teeth configured to flatten an uneven shape at the position on the sheet bundle bound, to unbind the sheet bundle;

a movement assembly configured to move the plurality of crimping teeth and the plurality of flat plate teeth to the position on the sheet bundle; and circuitry configured to:

cause the plurality of crimping teeth to sandwich the position on the sheet bundle; and cause the plurality of flat plate teeth to sandwich the position on the sheet bundle.

* * * * *